United States Patent
Yap

(10) Patent No.: US 10,824,049 B1
(45) Date of Patent: Nov. 3, 2020

(54) OPTICAL-FREQUENCY UP-CONVERTING SPECTROMETRIC IMAGER

(71) Applicant: HRL Laboratories, LLC, Malibu, CA (US)

(72) Inventor: Daniel Yap, Newbury Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 271 days.

(21) Appl. No.: 16/054,233

(22) Filed: Aug. 3, 2018

Related U.S. Application Data

(60) Provisional application No. 62/569,340, filed on Oct. 6, 2017.

(51) Int. Cl.

| | |
|---|---|
| G02F 1/355 | (2006.01) |
| H01S 3/108 | (2006.01) |
| H01S 3/094 | (2006.01) |
| H01S 3/083 | (2006.01) |
| G01J 3/28 | (2006.01) |
| G01J 3/10 | (2006.01) |
| G01J 3/02 | (2006.01) |
| G02F 1/35 | (2006.01) |

(52) U.S. Cl.
CPC .......... G02F 1/3551 (2013.01); G01J 3/021 (2013.01); G01J 3/108 (2013.01); G01J 3/2823 (2013.01); G02F 1/3544 (2013.01); H01S 3/083 (2013.01); H01S 3/094096 (2013.01); H01S 3/108 (2013.01); G02F 2001/3548 (2013.01)

(58) Field of Classification Search
CPC ............... G02F 1/3551; G02F 1/3544; G02F 2001/3548; G01J 3/021; G01J 3/2823; G01J 3/108; H01S 3/094096; H01S 3/108; H01S 3/083
See application file for complete search history.

(56) References Cited

U.S. PATENT DOCUMENTS

| | | |
|---|---|---|
| 4,467,038 A | 8/1984 | Scott |
| 4,962,042 A | 10/1990 | Morabito |
| 6,248,078 B1 | 6/2001 | Risby |
| 7,101,340 B1 | 9/2006 | Braun |
| 7,368,000 B2 | 5/2008 | Jain |
| 7,508,521 B2 | 3/2009 | Liu |
| 7,704,301 B2 | 4/2010 | Zhou |
| 8,999,245 B2 | 4/2015 | Wang |

(Continued)

OTHER PUBLICATIONS

From U.S. Appl. No. 15/669,519 (non-publication request filed), Office Action dated May 6, 2019.

(Continued)

*Primary Examiner* — David P Porta
*Assistant Examiner* — Meenakshi S Sahu
(74) *Attorney, Agent, or Firm* — Ladas & Parry

(57) ABSTRACT

An optical imager comprising an input lens system, a non-linear optic crystal, a pump source, and a photodetector array; the input lens system coupling input or incident light onto the non-linear optic crystal, the pump source providing pump light for the non-linear optical crystal, the non-linear optical crystal producing output light from a combination of the input light and the pump light, and the photodetector array detecting the output light produced by the non-linear optic crystal. The non-linear optic crystal preferably has a waveguided structure. The non-linear optic crystal has an optical cavity which is preferably shared with optical cavities of a plurality of lasers generating the pump light.

25 Claims, 24 Drawing Sheets

(56) References Cited

U.S. PATENT DOCUMENTS

| | | |
|---|---|---|
| 9,903,757 B1 | 2/2018 | Yap |
| 2005/0023127 A1 | 2/2005 | Woste |
| 2006/0130649 A1 | 6/2006 | Jain |
| 2007/0273882 A1 | 11/2007 | Smith |
| 2008/0288182 A1 | 11/2008 | Cline |
| 2009/0001262 A1 | 1/2009 | Visser |
| 2010/0140461 A1 | 6/2010 | Sprigle |
| 2010/0154511 A1 | 6/2010 | Lambertus |
| 2012/0133775 A1 | 5/2012 | Treado |
| 2013/0129182 A1 | 5/2013 | Noyel |
| 2013/0250301 A1 | 9/2013 | Feitisch |
| 2015/0032019 A1 | 1/2015 | Acker |
| 2016/0132617 A1 | 5/2016 | Liu |

OTHER PUBLICATIONS

From U.S. Appl. No. 15/669,519 (non-publication request filed), Office Action dated Dec. 10, 2018.

U.S. Appl. No. 15/669,519, filed Aug. 4, 2017, Yap.

U.S. Appl. No. 15/280,575, filed Sep. 29, 2016, Owechko.

From U.S. Appl. No. 15/669,519 (non-publication request filed), Office Action dated Jun. 13, 2018.

From U.S. Appl. No. 15/669,519 (non-publication request filed), Office Action dated Mar. 20, 2018.

Albota, M.A., et al. "Efficient single-photon counting at 1.55 μm by means of frequency upconversion," Optics Letters, vol. 29, No. 13 (2004), pp. 1449-1451.

Baren, R.E. et al., "Quad Quantum Cascade Laser Spectrometer with Dual Gas Cells for the Simultaneous Analysis of Mainstream and Sidestream Cigarette Smoke," Spectrochimica Acta Part A, vol. 60, pp. 3437-3447, 2004.

Barkai, A. et al., "Double-stage taper for coupling between SOI waveguides and single-mode fiber," Journal of Lightwave Technology, v. 26, n. 24, pp. 3860-3865 (2008).

Bruckstein et al., "From Sparse Solutions of Systems of Equations to Sparse Modeling of Signals and Images" SIAM Review, vol. 51, No. 1, pp. 34-81, 2009.

Cardoso, J., "High-order contrasts for independent component analysis," Neural Computation, vol. 11, No. 1, pp. 157-192, 1999.

Clement, Q. et al., "Pulsed, tunable, single-frequency OP-GaAs OPO for the standoff detection of hazardous chemicals in the longwave infrared," Proceeding of SPIE vol. 9649 (2015), pp. 964904-1 to 964904-10 (11 pages).

Collin, W.R. et al., "Microfabricated Gas Chromatograph for Rapid, Trace-level Determinations of Gas-phase Explosive Marker Compounds," Analytical Chemistry, vol. 86, pp. 655-663, 2013.

DeCamp, M.F. et al., "Upconversion multichannel infrared spectrometer," Optics Letters, vol. 30, No. 14 (2005), pp. 1818-1820.

Devi, K. et al., "Continuous-wave, multi-milliwatt, mid-infrared source tunable across 6.4-7.5 μm based on orientation-patterned GaAs," Optics Letters, vol. 39, No. 23 (2014), pp. 6751 to 6754.

Jin, C. et al., "Limits of Recognition for Binary and Ternary Vapor Mixtures Determined with Multitransducer Arrays," Analytical chemistry, vol. 80, No. 19 , pp. 7283-7293, May 9, 2008.

Liu, J. et al., "Adaptive Two-dimensional Microgas Chromatography," Analytical Chemistry, vol. 84, pp. 4214-4220, 2012.

Liu, J. et al., "Smart Multi-channel Two-dimensional Micro-gas Chromatography for Rapid Workspace Hazardous Volatile Organic Compounds Measurement," Lab on a a Chip, vol. 13, pp. 818-825, Dec. 2012.

Lloyd, S., "Least squares quantization using PCM," IEEE Transactions on Information Theory, vol. 28, No. 2, pp. 129-137, Mar. 1982.

Ma, L. et al., "Up-conversion single-photon detector using multiwavelength sampling techniques," Optics Express, vol. 19, No. 6 (2011) pp. 5470 to 5479.

Mengali, S. et al."Rapid Screening and Identification of Illicit Drugs by IR Absorption Spectroscopy and Gas Chromatography," Proceedings of SPIE, vol. 8631, pp. 86312F 1 to 86312F 10, 2013.

Pacheco-Londono, L.C, et al., "Detection of Nitroaromatic and Peroxide Explosives in Air Using Infrared Spectroscopy: QCL and FTIR," Advances in Optical Technologies, vol. 2013, Article ID 532670, Mar. 11, 2013 (9 pages).

Pelc, J.S. et al., "Influence of domain disorder on parametric noise in quasi-phase-matched quantum frequency converters," Optics Letters, vol. 35, No. 16 (2010), pp. 2804-2806.

Phillips, M.C., et al., "Real-time Trace Gas Sensing of Fluorocarbons using a Swept-wavelength External Cavity Quantum Cascade Laser," Analyst, vol. 139, pp. 2047-2056, 2014.

Ragunathan, N. et al., "Gas Chromatography with Spectroscopic Detectors," J. Chromatography A, vol. 856, pp. 349-397, 1999.

Rutledge, D. N., "Independent Components Analysis with the JADE algorithm", TrAC Trends in Analytical Chemistry, vol. 50, pp. 22-32, 2013.

Sun, Y. et al., "A Semi-blind Source Separation Method for Differential Optical Absorption Spectroscopy of Atmospheric Gas Mixtures," Inverse Problems and Imaging, vol. 8, No. 2, pp. 587-610, 2014.

Temporao, G. et al,"Mid-infrared single-photon counting," Optics Letters, vol. 31, No. 8 (2006), pp. 1094 to 1096.

Wagner, et al., "Towards a Practical Face Recognition System: Robust Alignment and Illumination by Sparse Representation," IEEE Transactions on Pattern Analysis and Machine Intelligence (TPAMI), vol. 34, No. 2, pp. 372-386, Feb. 2012.

Wright, A. et al., "Robust Face Recognition via Sparse Representation" IEEE Transactions on Pattern Analysis and Machine Intelligence (TPAMI), vol. 31. No. 2, Feb. 2009.

Wu, S. et al. "Hollow Waveguide Quantum Cascade Laser Spectrometer as an Online Microliter Sensor for Gas Chromatography," Journal of Chromatography A, vol. 1188, pp. 327-330, 2008.

Zhang, Q. et al., "Waveguide-based single-pixel up-conversion infrared spectrometer," Optics Express, vol. 16, No. 24 (2008), pp. 19557 to 19561.

From U.S. Appl. No. 15/669,519 (non-publication request filed), Office Action dated Oct. 16, 2019.

Prior demonstration using pump pulses of different wavelength of selectively sample and up-convert different pulses of input light.

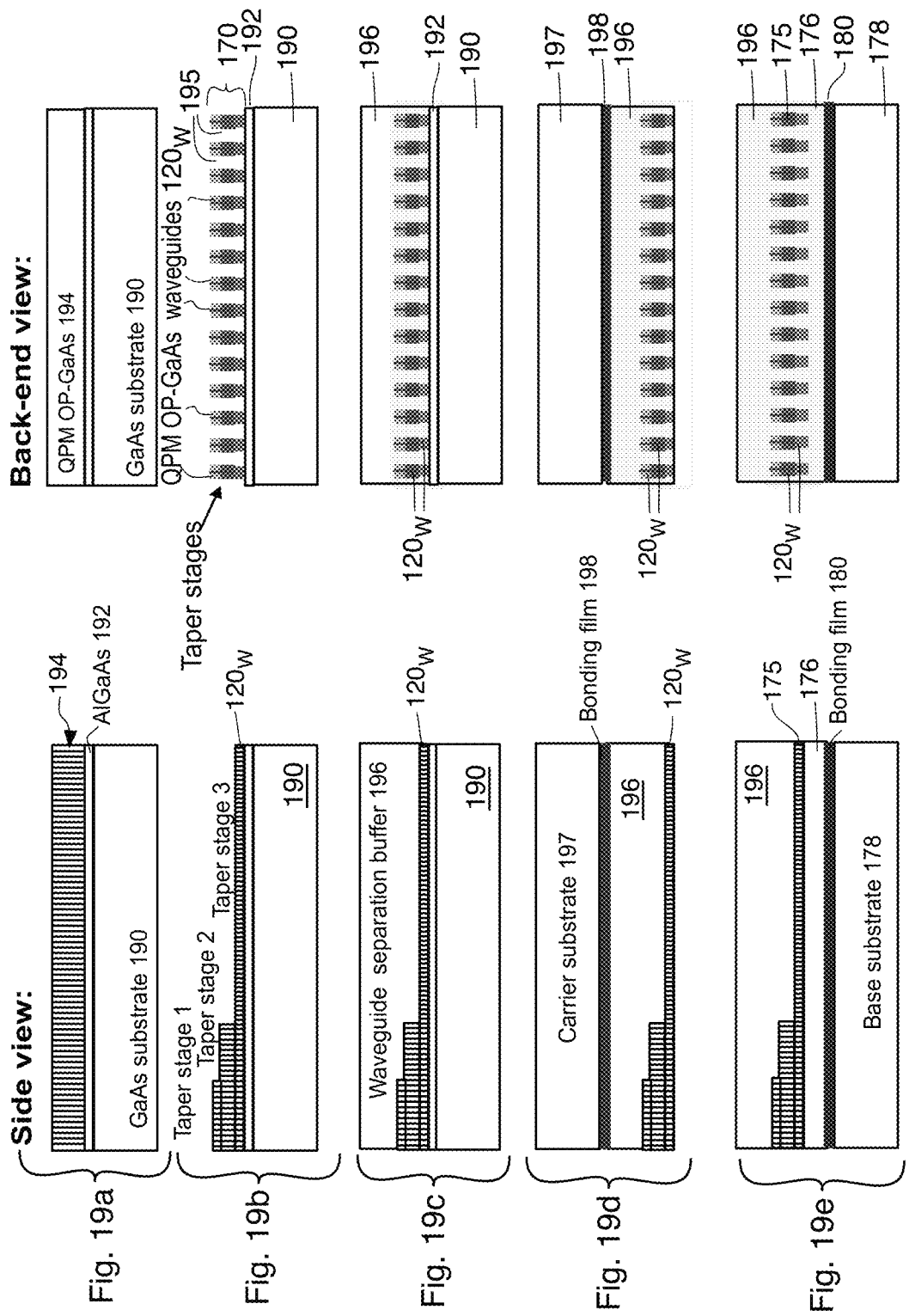

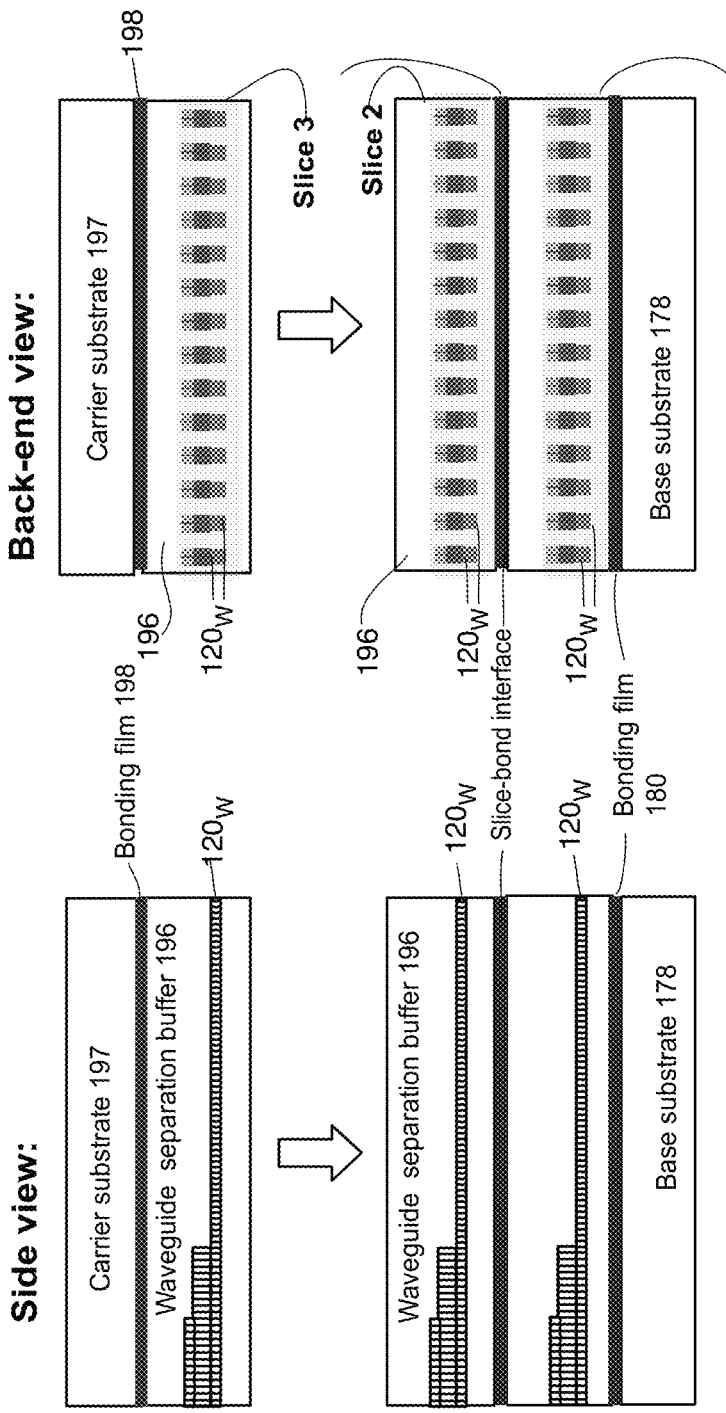
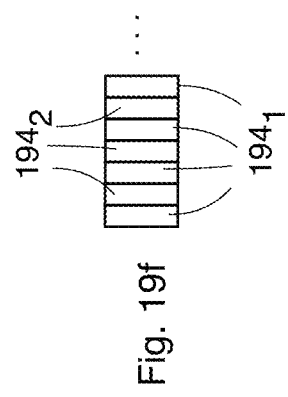
Fig. 19f
Fig. 20a
Fig. 20b

OPTICAL-FREQUENCY UP-CONVERTING SPECTROMETRIC IMAGER

CROSS REFERENCE TO RELATED APPLICATIONS

This application claims the benefit of U.S. Provisional Patent Application Ser. No. 62/569,340 filed 6 Oct. 2017 and entitled "Optical-Frequency Up-Converting Spectrometric Imager", the disclosure of which is whereby incorporated hereby be reference.

This application is related to U.S. patent application Ser. No. 15/669,519 filed Aug. 4, 2017 and entitled "Adaptive Gas Analyzer" the disclosure of which is hereby incorporated hereby by reference.

STATEMENT REGARDING FEDERALLY SPONSORED RESEARCH OR DEVELOPMENT

None

TECHNICAL FIELD

This invention relates to improvements in Optical-Frequency Up-Converting Spectrometric Imagers. The disclosed imager essentially produces a set of images, with each image corresponding to a different subset of the wavelengths comprising the input light. As disclosed, each of these wavelength-specific images is produced at a different time from the images corresponding to the other wavelengths.

BACKGROUND

Prior art imagers for long-wave infrared (LWIR) and very-long-wave infrared (VLWIR) radiation typically have an input collecting and focusing lens system and a LWIR/VLWIR sensing focal-plane-array (FPA) detector located at the focus of that input lens system. To achieve low detector-associated noise (i.e., low detector dark-current noise), the prior FPA detectors are typically cooled to liquid nitrogen temperature (77K) or even lower temperature, with that cooling typically achieved by a cryogenic cooler. Examples of these prior LWIR/VLWIR sensing FPA detectors that must be cryo-cooled include those based on narrow-bandgap HgCdTe materials, those based on type-II superlattice materials (such as InAs/GaSb structures), and those based on GaAs/AlGaAs quantum-well infrared photodetectors (QWIPs). For detection of VLWIR light, the operating temperature of the FPA detectors typically is ≤60K. The cryo-coolers are relatively bulky and the FPA detectors must be placed inside bulky dewars that insulate those detectors from the ambient temperature. The cryo-coolers also have limited lifetime and issues with reliability because they typically involve moving parts, such as pumps and pistons.

In comparison, the disclosed imager can have many, if not most, of its components operated at room temperature with non-mechanical thermo-electric (TE) coolers used to maintain their temperature. The disclosed imager does include one or more high-power pump lasers whose gain elements would need to be cooled to remove the heat they generate. However, the power consumption associated with these gain elements and their TE cooling is comparable to or less than the power consumption of the cryo-coolers that would be needed for the conventional FPA detectors.

Micro-bolometer based thermal detectors for LWIR/VLWIR radiation can be operated at room temperature. However, their dark current density is nearly three orders of magnitude higher than that of the cryo-cooled LWIR/VLWIR photon detectors and of the equivalent noise current density of the up-conversion imager.

A sum-frequency generation (SFG) process has been used in the past to produce light detected by single photodetectors rather than an array of detectors such as a FPA. Thus, these past demonstrations of SFG are not consistent with the imaging provided by a staring imager, in contrast to a scanning imager that might be obtained by using mirrors to move the relatively small area observed at a given instance of time by a single photodetector. SFG was used to enable detection of the characteristics of 4.65 µm wavelength mid-wave infrared (MWIR) light with a single silicon avalanche photodiode by converting that MWIR light to 0.81 µm wavelength light (see FIG. 1a and G. Temporao, et al, "Mid-infrared single-photon counting," *Optics Letters*, v. 31, n. 8 (2006) p. 1094). This was accomplished with a pump laser of 0.98 µm wavelength and a non-linear optical NLO element comprising periodically poled lithium niobate (PPLN). Also, 1.55 µm light was converted to 0.63 µm light for detection by a silicon avalanche photodiode by SFG in PPLN with 1.06 µm pump light (see FIG. 1b and M. A. Albota and F. N. C. Wong, "Efficient single-photon counting at 1.55 µm by means of frequency upconversion," *Optics Letters*, v. 29, n. 13 (2004), p. 1449). This prior demonstration placed the PPLN NLO element within an optical cavity to enhance the pump power beyond what could be produced by the pump laser itself.

A prior infrared spectrometer (see FIG. 2) based on up-conversion spatially dispersed the spectral information centered about 3.8 µm wavelength with an optical grating and then used SFG to convert those MWIR photons to photons that were then detected by a silicon charge-coupled-device (CCD) array. See M. F. DeCamp and A. Tokmakoff, "Upconversion multichannel infrared spectrometer," *Optics Letters*, v. 30, n. 14 (2005), p. 1818. Different spatially dispersed portions of the MWIR spectrum were associated with different detector elements of the CCD array.

Another prior spectrometer (see FIG. 3 and Q. Zhang, et al., "Waveguide-based single-pixel up-conversion infrared spectrometer," *Optics Express*, v. 16, n. 24 (2008) p. 19557) based on up-conversion scanned the wavelength of the pump laser, whose nominal wavelength is in the 1.5 µm range to convert input light in the 1.3 µm wavelength range for detection by a silicon avalanche photodiode. This spectrometer made use of the limited spectral-acceptance bandwidth (0.2 nm wide) of the PPLN quasi-phase-matching (QPM) waveguide, which also was the NLO element, to provide the frequency selectivity of the spectrometer.

Finally, a prior demonstration of up-conversion made use of a multi-wavelength train of pump pulses in which different successive pulses have different wavelength (see FIG. 4 and L. Ma, et al., "Up-conversion single-photon detector using multi-wavelength sampling techniques," *Optics Express*, v. 19, n. 6 (2011) p. 5470). The train of output up-converted pulses were then spatially dispersed by a grating to direct pulses of different wavelength to different silicon avalanche photodiodes.

PPLN is transparent only for MWIR and shorter wavelengths. The inventor is not aware of any prior demonstrations of a sum-frequency generation (SFG) process in which LWIR or VLWIR wavelength (8-16 µm) light was converted to a much shorter wavelength. NLO QPM elements comprising other materials such as OP-GaAs or OP-GaP could be used to achieve three-wave mixing that involves an optical wave whose wavelength is in the LWIR/VLWIR range. GaP is transparent in the wavelength range between 0.6 μm and 11 μm and would be suitable for SFG with LWIR input light. GaAs is transparent in the wavelength range between 0.85 μm and 17 μm and would be suitable for SFG with both LWIR and VLWIR input light. However, the OP-GaAs and OP-GaP material have thus far been used only for demonstrations in which longer-wavelength light is generated from shorter-wavelength light by processes such as difference-frequency generation (DFG) or amplified parametric fluorescence (in an optical parametric oscillator). In one prior example, output light of 10.3-10.9 μm wavelength was produced by a parametric oscillator from a fixed-wavelength pump light and no other input light, as illustrated in FIG. 5. In another prior example, tunable output light of 6.4-7.5 μm wavelength was produced by DFG from a fixed-wavelength pump at 2.01 μm and a second tunable input of 2.4-2.9 μm wavelength. See K. Devi, P. G. Schunemann and M. Ebrahim-Zadeh, "Continuous-wave, multi-milliwatt, mid-infrared source tunable across 6.4-7.5 μm based on orientation-patterned GaAs," *Optics Letters*, v. 39, n. 23 (2014) p. 6751.

The benefits of a LWIR/VLWIR imager that operates at room temperature but that has the noise performance of imagers operating at cryo-cooled temperature have been known for many years. The OP-GaAs material was reported as early as 2001 by a research group at Stanford University and the up-conversion technique based on SFG with PPLN material was reported by the same research group as early as 2005. Since that time, this research group at Stanford has done much work on OP-GaAs as well as on up-conversion. Also, many other organizations have done work on OP-GaAs and OP-GaP as well as on up-conversion by SFG. However, there still have been no prior reports of SFG involving OP-GaAs or OP-GaP to produce short wave infrared (SWIR) output light from LWIR or VLWIR input light.

Also, InGaAs/InP photodetectors and FPAs have been commercially available components for many years. The prior work on up-conversion have made use of silicon avalanche photodiodes and some of those prior reports also discussed InGaAs/InP photodetectors as being less desirable than the silicon devices. However, InGaAs-based photodetectors (albeit modified to have extended spectral coverage) have been used together with OP-GaAs to detect the 2.36-2.39 μm light produced by an optical parametric oscillator (see FIG. 5 and Q. Clement, et al., "Pulsed, tunable, single-frequency OP-GaAs OPO for the standoff detection of hazardous chemicals in the longwave infrared," *Proceeding of SPIE Vol.* 9649 (2015) p. 964904). Thus, if it were obvious to combine the known elements of the present disclosure in the configuration of the disclosed imager, it should have been done by now.

For the prior art reference by DeCamp and Tokmakoff (identified above) that involved a multiple-detector CCD array, although the orthogonal spatial dimension of the SFG output from the dimension used to represent the spectral information might have been used for imaging, there was no mention of such use in the article cited. Instead, the authors said that this other dimension "represented the focusing conditions of the incident IR beam." Also, the researchers chose, instead, to use that orthogonal dimension of the CCD array to record a second independent spectrum, with one spectrum for an incident IR beam that had passed through a material with a characteristic IR absorption spectrum and the second spectrum for an incident IR beam that had not passed through the IR absorbing material.

BRIEF DESCRIPTION OF THE INVENTION

An optical imager comprising an input lens system, a non-linear optic crystal, a pump source, and a photodetector array; the input lens system coupling input light onto the non-linear optic crystal, the pump source providing pump light for the non-linear optical crystal, the non-linear optical crystal producing output light from the combination of the input light and the pump light, and the photodetector array detecting the output light produced by the non-linear optic crystal.

The input light has a wavelength longer than the wavelength of the pump light and the wavelength of the output light.

The pump light has a wavelength longer than the wavelength of the output light.

The output light preferably has a wavelength longer than 1.2 μm. The pump light has a wavelength preferably in the range of 1.2 to 2.5 μm.

The input light has a wavelength preferably in the range of 4 to 16 μm.

An optical imager comprising an input lens system, a non-linear optic element or crystal, a pump source, and a photodetector array; the input lens system coupling input light onto the non-linear optic element or crystal, the pump source providing pump light for the non-linear optical crystal, the non-linear optical crystal producing output light from the combination of the input light and the pump light, and the photodetector array detecting the output light produced by the non-linear optic crystal.

The non-linear optic crystal may be embodied as a non-linear optic element comprising an arrangement of multiple non-linear optic waveguides.

BRIEF DESCRIPTION OF THE DRAWINGS

FIGS. 19a-19f, 20a and 20b illustrate some of the key steps in a process for fabricating a waveguided embodiment of NLO element that comprises multiple NLO waveguides.

DETAILED DESCRIPTION

Figure 1A:
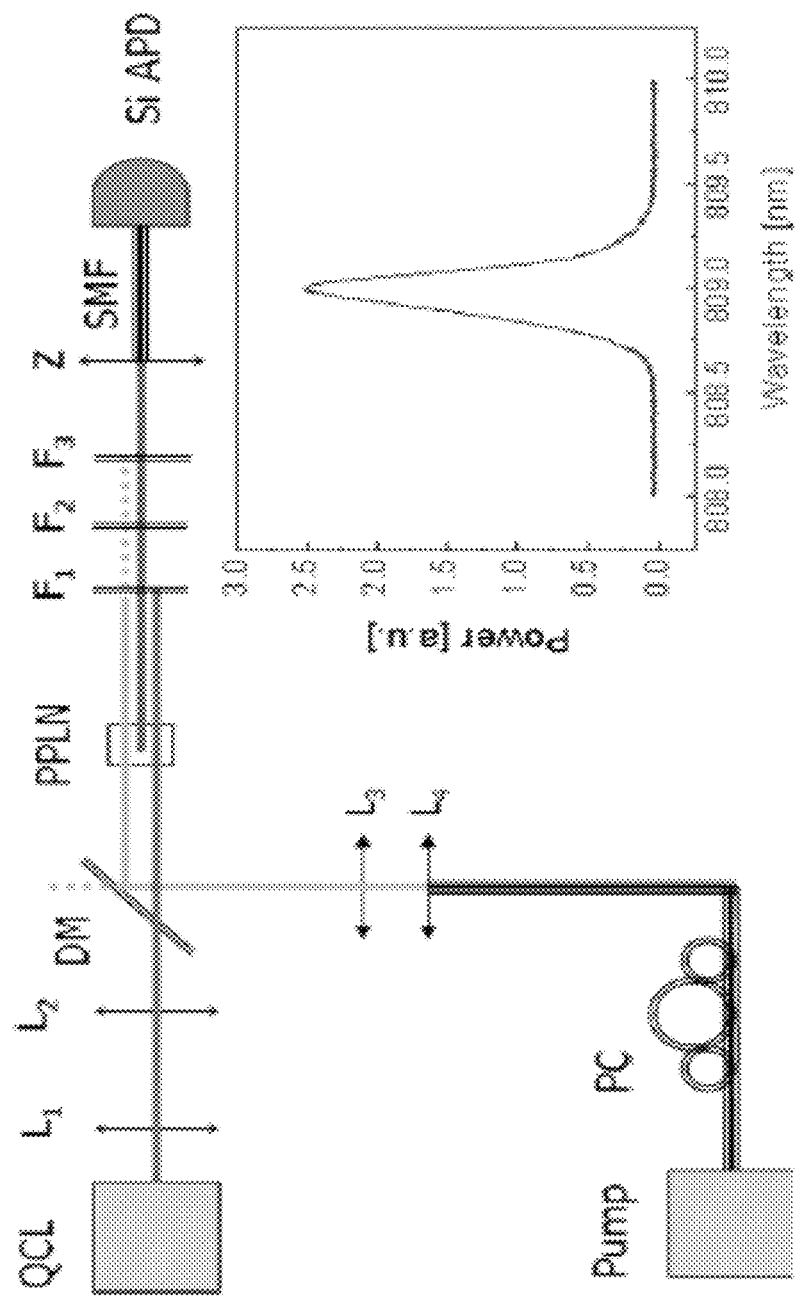
FIGS. 1(*a*) and 1(*b*) depict the optical configurations for prior art demonstrations up-converting 4.65 μm input light and for up-converting 1.55 μm input light for detection by a silicon avalanche photodiode.
Figure 1B:
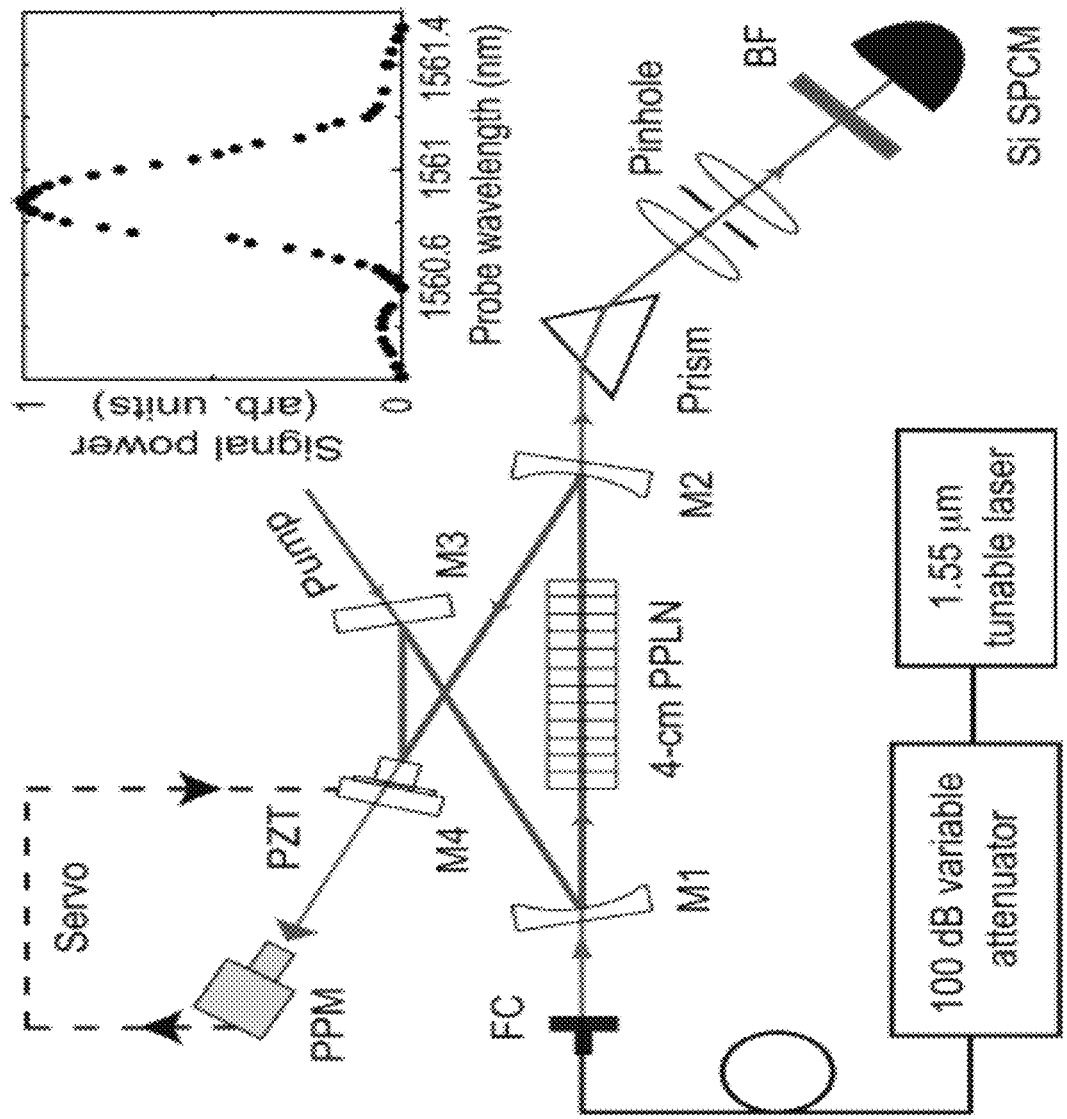
Figure 2:
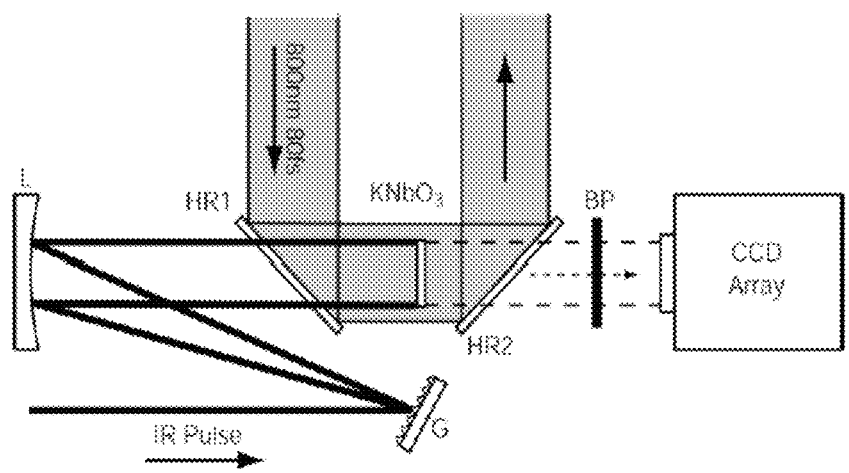
FIG. 2 depicts a prior art spectrometer based on spatially dispersing the input light prior to up-conversion.
Figure 3:
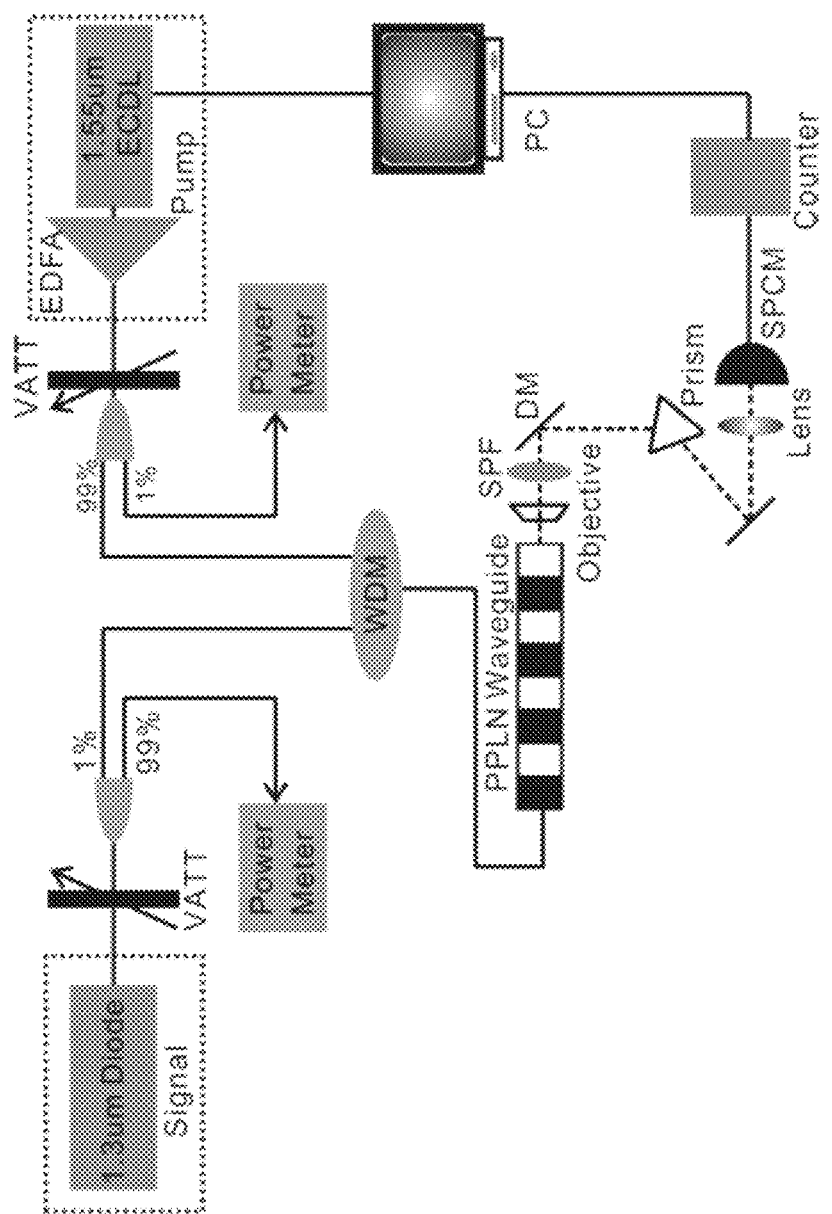
FIG. 3 depicts a prior art spectrometer based on scanning the wavelength of a tunable pump laser.
Figure 4:
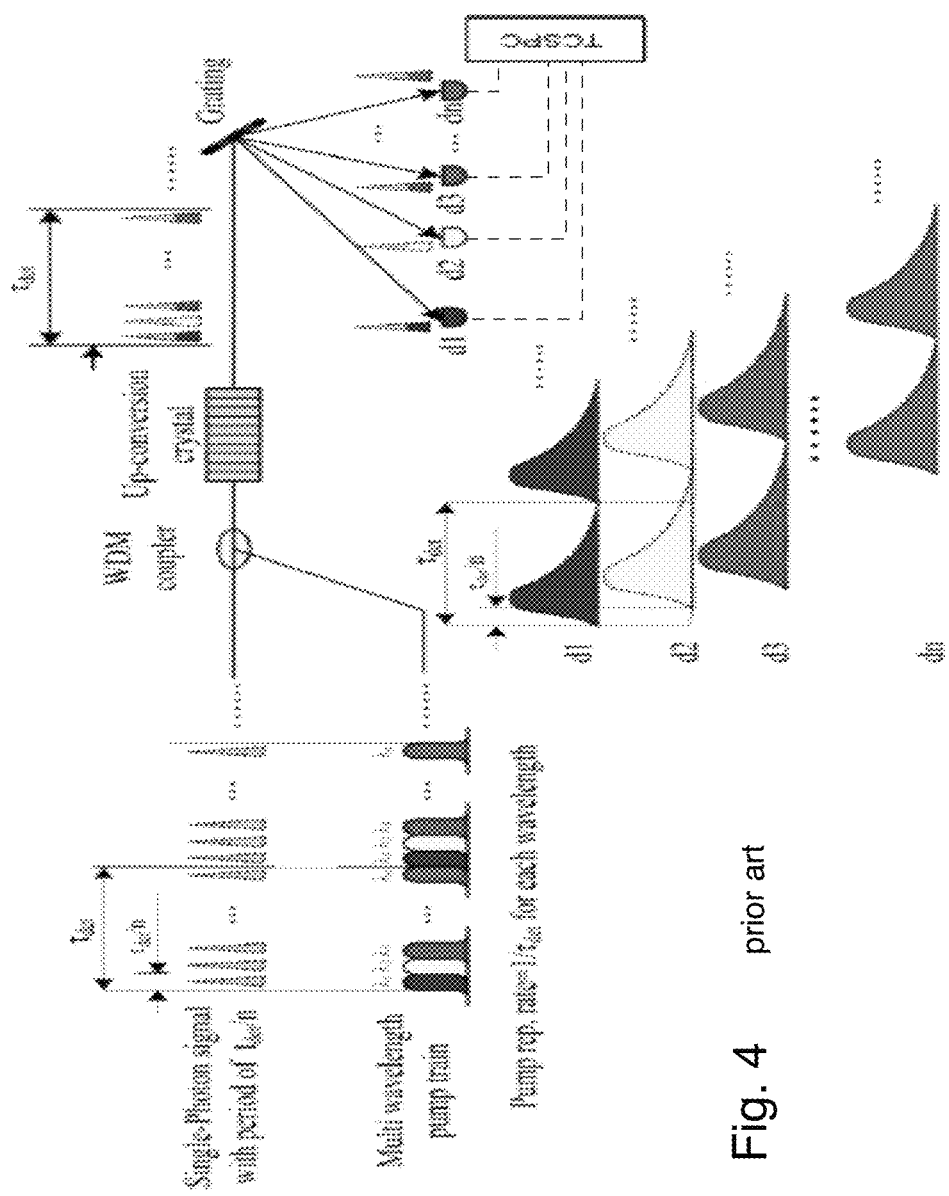
FIG. 4 depicts a prior art demonstration using pump pulses of different wavelengths present at different instances of time to selectively sample and up-convert different pulses of input light.
Figure 5:
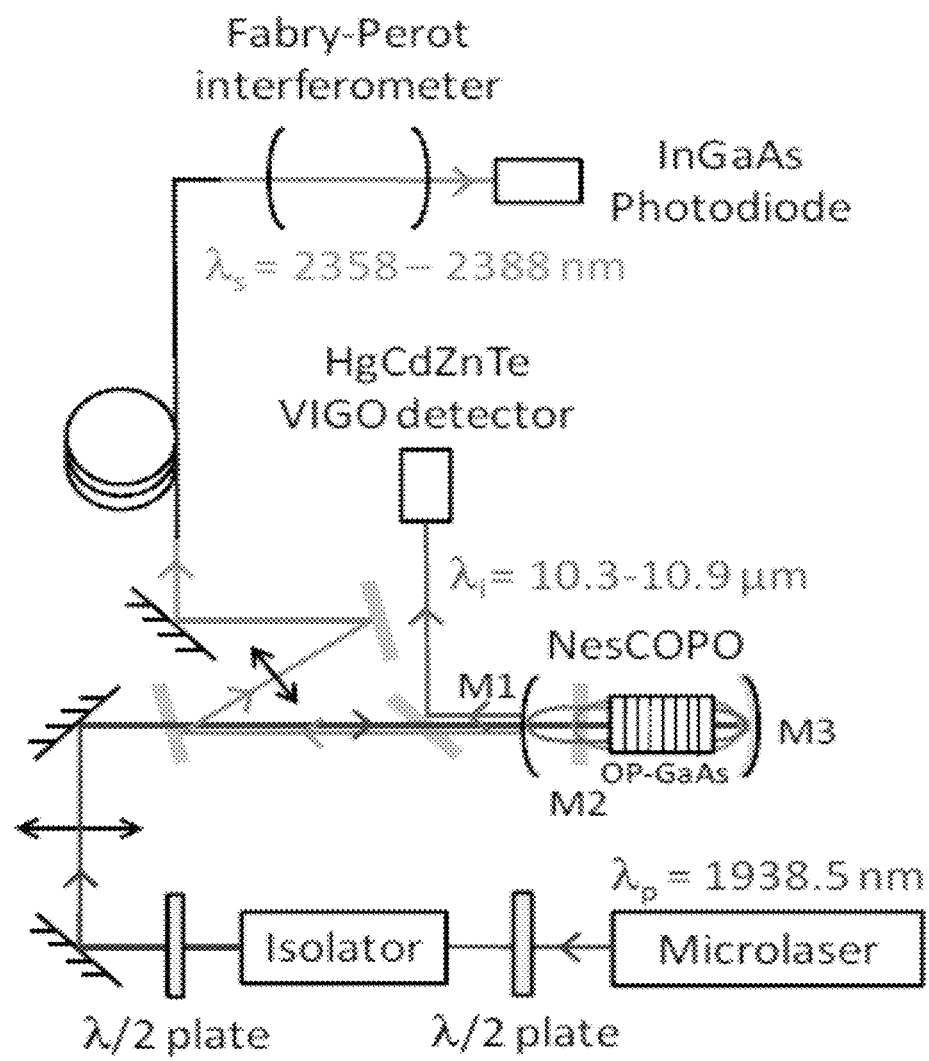
FIG. 5 shows a configuration of a prior art optical parametric oscillator for generation of LWIR light from pump light of shorter wavelength.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

This application includes numerous embodiments of an up-converting imager 1000. Elements which either are identical or are very similar in function often share the reference numeral between these embodiments to avoid an unnecessary repetition of their descriptions. For example, an initial embodiment is described with reference to FIG. 6. Additional embodiments are described thereafter with their descriptions focusing more on the differences between the embodiments than the similarities. Elements which are either identical or very similar in terms of their function in the additional embodiments (compared to the embodiment of FIG. 6) share the same reference numerals with little or no additional description needed to understand the additional embodiments.

Figure 6:
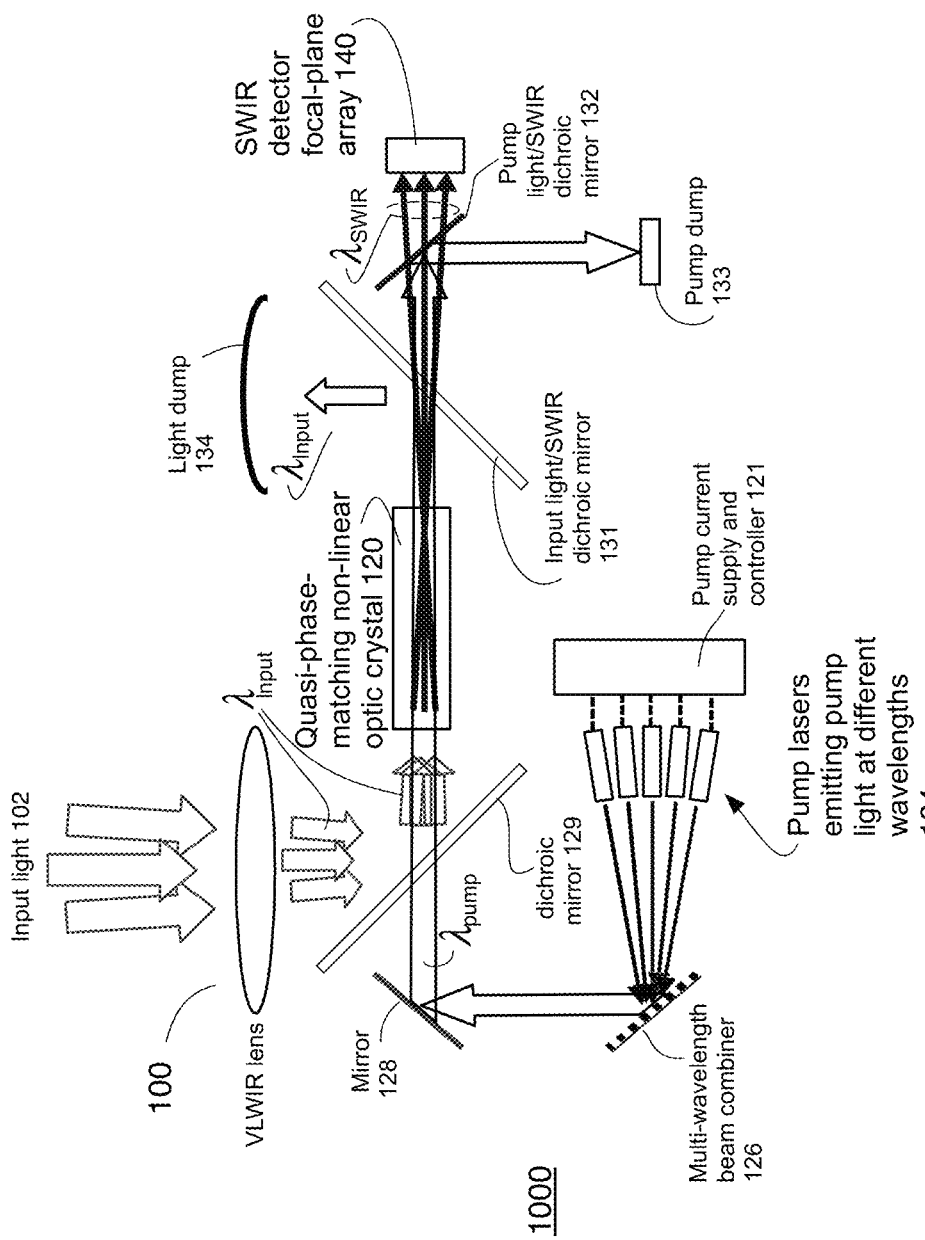
FIG. 6 illustrates basic components of an exemplary up-converting imager according to one embodiment of the present invention.

FIG. 6 depicts some key parts in one embodiment of an up-converting imager 1000, which can function as a spectrometer, in accordance with the present invention. The embodiment of an up-converting imager and spectrometer depicted by FIG. 6 includes an input lens system 100 that couples input light from a distant source 102 into a quasi-phase-matching (QPM) non-linear optic (NLO) element or crystal 120. Element 120 is referred to as a "non-linear" element simply because it generates output light having a frequency which is different from the frequency of the input light. Although input light from source 102 of VLWIR wavelengths (12-16 µm) is illustrated in this and other embodiments, light of other wavelength ranges such as LWIR (8-12 µm), and mid-infrared (MIR 3-20 µm), also may be appropriate. The MIR range includes the MWIR, LWIR and VLWIR wavelength ranges. For VLWIR light of 12-16 µm wavelength, a suitable NLO 120 crystal material is OP-GaAs. The OP-GaAs material also could be used with LWIR light of 8-12 µm wavelength, for example. For MIR light of 3-11 µm wavelength, OP-GaP could be used as the QPM NLO crystal 120 material. Light from one or more pump lasers 124 is also coupled into the NLO crystal 120. Exemplary wavelengths for the light from the one or more pump lasers 124 are discussed below. The NLO crystal may be embodied by a two dimensional array of waveguides as is described later with respect to FIGS. 14, 15, 17, 19a-19f and 20a-20b. The up-converted light, produced as a result of a sum-frequency generation (SFG) process in the NLO element or crystal 120, exits the opposite end of the NLO element or crystal 120 from which the input light is coupled into the NLO element or crystal 120. That up-converted SWIR light in the 1.2-2.5 µm wavelength range exiting the NLO element or crystal 120 can be coupled through a SWIR lens system 135 (illustrated in the embodiments depicted by FIGS. 9, 13 and 16) onto a SWIR FPA detector 140. One example of a SWIR FPA 140 is a FPA comprising InGaAs/InP detectors. The up-converted SWIR light exiting the NLO element or crystal 120 preferably has the same (or nearly the same) propagation angle, relative frequency and relative phase as the VLWIR light 102 coupled onto the NLO element or crystal 120. Thus, the up-converted SWIR light preferably retains whatever image information that is in the input VLWIR light 102.

The Input Light 102 is often labeled or identified as VLWIR light herein and in the figures, it being understood the the Input Light 102 may fall in other IR wavelength ranges (such as LWIR) as is discussed in the preceding and following paragraphs.

One aspect of the present invention provides an optical imager 1000 that accepts input light 102 whose wavelength $\lambda_{Input}$ is in the long-wave infrared (LWIR) range of 8-12 µm to and including the very-long-wave infrared (VLWIR) range of 12-16 µm and produces an image on a focal-plane-array (FPA) detector 140 that is responsive to light whose wavelength $\lambda_{SWIR}$ is in the short-wave infrared (SWIR) range of 1.2-2.5 µm. The imager 1000 in accordance with the present invention uses a non-linear optic (NLO) process of sum-frequency generation (SFG) to convert LWIR/VLWIR image information into SWIR image information via a three-wave mixing process that utilizes information-free pump light (preferably having wavelengths $\lambda_{PUMP}$ also generally in the range of 1.2-2.5 µm, but the pump wavelengths $\lambda_{PUMP}$ are selected to be somewhat longer than $\lambda_{SWIR}$) from one or more lasers 124. The wavelengths selected for the FPA detector 140 and the pump lasers 124 will depend on the wavelengths of the input light 102. For example, if the input light 102 is in the VLWIR range, then the wavelengths $\lambda_{SWIR}$ selected for the FPA detector may be about 1.6 to 1.7 µm while the pump laser wavelengths $\lambda_{PUMP}$ may then be about 1.9 µm. In any case, the imager 1000 preferably comprises an input lens system 100, a NLO element 120, an optional output lens system 135, and a FPA detector 140.

Sum-frequency generation (SFG) inherently occurs within the NLO element 120, but the efficiency of the SFG process depends on the pump power density. SFG produces a photon of SWIR output light from the NLO element 120 by a combination of an input photon of the input LWIR/VLWIR input light 102 and an input photon of pump light from pump lasers 124. The optical frequency of the output light from the NLO element 120 is equal to the sum of the optical frequencies of the LWIR/VLWIR input light 102 and pump light from pump lasers 124. The NLO element 120 also serves to provide quasi-phase-matching (QPM) for the three optical waves (a LWIR/VLWIR wave, a SWIR wave and a pump wave) propagating through the NLO element 120. The QPM compensates for the wavelength (or optical frequency) dependent variation in the refractive index (or optical-wave propagation velocity) of the NLO element 120. The FPA detector 140 is preferably responsive only to the light produced from the SFG process and is not responsive to the LWIR/VLWIR input light 102 or to the pump light from lasers 124. Nevertheless, dichroic mirrors 131 and 132 are preferably utilized as shielding means to (i) shield the FPA detector 140 from the LWIR/VLWIR input light 102 (by means of dichroic mirror 131) and (ii) shield the FPA detector 140 from the pump input light (by means of dichroic mirror 132) in this and other embodiments. In some embodiments, other elements such as a SWIR/pump light band-limiting filter 146 (see the embodiments of FIGS. 10 and 12c) or a dichroic mirror/lens 132' (see the embodiment of FIG. 12b), may be utilized. A typical SWIR detector is not sensitive to the LWIR/VLWIR light. However, a typical SWIR detector, containing a GaInAs absorber, could be sensitive to the pump light if the wavelength of that pump light is below 1670 nm. Additional band-limiting filter 146 would be beneficial in that event. Also, since the pump light is much more intense than the up-conversion generated SWIR light, pump light leaked to the photodetector could saturate the detector, and therefore depending on the FPA detector 140 selected, taking steps to shield the FPA detector 140 from the pump light (in addition to the LWIR/VLWIR input light 102) make good design sense in most embodiments.

The utilization of SFG in a NLO element 120 to produce SWIR light for detection by a FPA detector 140 from LWIR/VLWIR input light 102 with a pump laser 124 whose output wavelength $\lambda_{PUMP}$ is longer than the wavelength $\lambda_{SWIR}$ of the SWIR light but also shorter than the wavelength $\lambda_{Input}$ of the LWIR/VLWIR input light 102 is believed to be quite novel. Instead of SFG, the processes of difference frequency generation and parametric fluorescence in a NLO element 120 have been used in the past to produce LWIR or mid-wave infrared (MWIR) light from pump light whose wavelength is shorter than the LWIR or MWIR light produced.

The imager 1000 also may comprise one or more dichroic elements (see, for example, mirrors 129, 131) that separate/combine the LWIR/VLWIR light with the pump light and/or with the SWIR light. The imager also may comprise one or more dichroic elements (see, for example, mirrors 128, 132) that separate/combine the pump light with the SWIR light. Mirror 128 may be a dichroic mirror, but in many embodiments in need not be dichroic. Mirror 128 sees mainly the pump light but also would see VLWIR light reflected from the input surface of the NLO element (which may be embodied as a Quasi-Phase Matching (QPM) element or crystal) 120. But feedback of the non-pump light may not necessarily harm the performance of the pump lasers 124. If otherwise, mirror 128 may be embodied as a dichroic mirror should there be a desire to keep non-pump light out of the pump lasers 124. Of course, if mirror 128 need not be a dichroic mirror in a given embodiment, then it can be simply eliminated. For example, mirror 128 can be eliminated from the embodiments of FIGS. 6, 6a and 9.

The NLO element 120 can absorb light whose wavelength is greater than some minimum wavelength value. Preferably, the pump light has a wavelength ($\lambda_{pump}$) that is greater than twice this maximum wavelength value, such that the pump light is not absorbed in the NLO element 120 via a multi-photon absorption process, for example. Preferably, only conversion from one optical frequency ($\lambda_{Input}$) to another optical frequency ($\lambda_{SWIR}$) occurs by in the NLO element 120 by the aforementioned SFG process. Two-photon absorption is a non-linear optical process. Optical frequency (or photon energy) is inversely related to optical wavelength. Two-photon absorption is an undesirable loss process that can deplete some of the pump light so it is preferably avoided.

In the various embodiments, the imager 1000 can function as a spectrometer. If the imager 1000 is desirously to function as a spectrometer, then the imager 1000 may include an optical wavelength combiner 126 that combines multiple wavelengths of pump light from pump 124 into a single optical beam. In some embodiments (see, for example, FIGS. 12a-12c), the optical wavelength combiner 126 is located within a laser cavity producing the pump laser 124 light. The utilization of different pump wavelengths provides for enablement of a spectrometric function. If a spectrographic functionality it not needed or desired then the laser pump light may originate from a single laser of either a fixed frequency or variable frequency laser and the optical wavelength combiner 126 may be omitted. However, in that event, the LWIR/VLWIR spectral range over which the imager would be responsive is quite small (around 50-500 nm) if there is only one pump laser 124 having a fixed pump wavelength. Note that the LWIR spectral range covers 8000-12000 nm and VLWIR covers 12000-16000+nm. Thus, the utility of an imager that has only a single non-tunable pump laser would likely be quite limited.

So, in most of the disclosed embodiments, the imager 1000 is provided with multiple pump lasers 124 each emitting light of a different pump wavelength so that the imager 1000 can function as a spectrometer. In some embodiments, the imager includes a gain-controller (see element 121 on FIG. 6) that controls the pump lasers 124 such that different pump lasers are activated to provide pump light a different times. And in some embodiments, one or more variable frequency pump lasers 124' may be utilized (see, for example, the embodiment of FIG. 6a).

Figure 11:
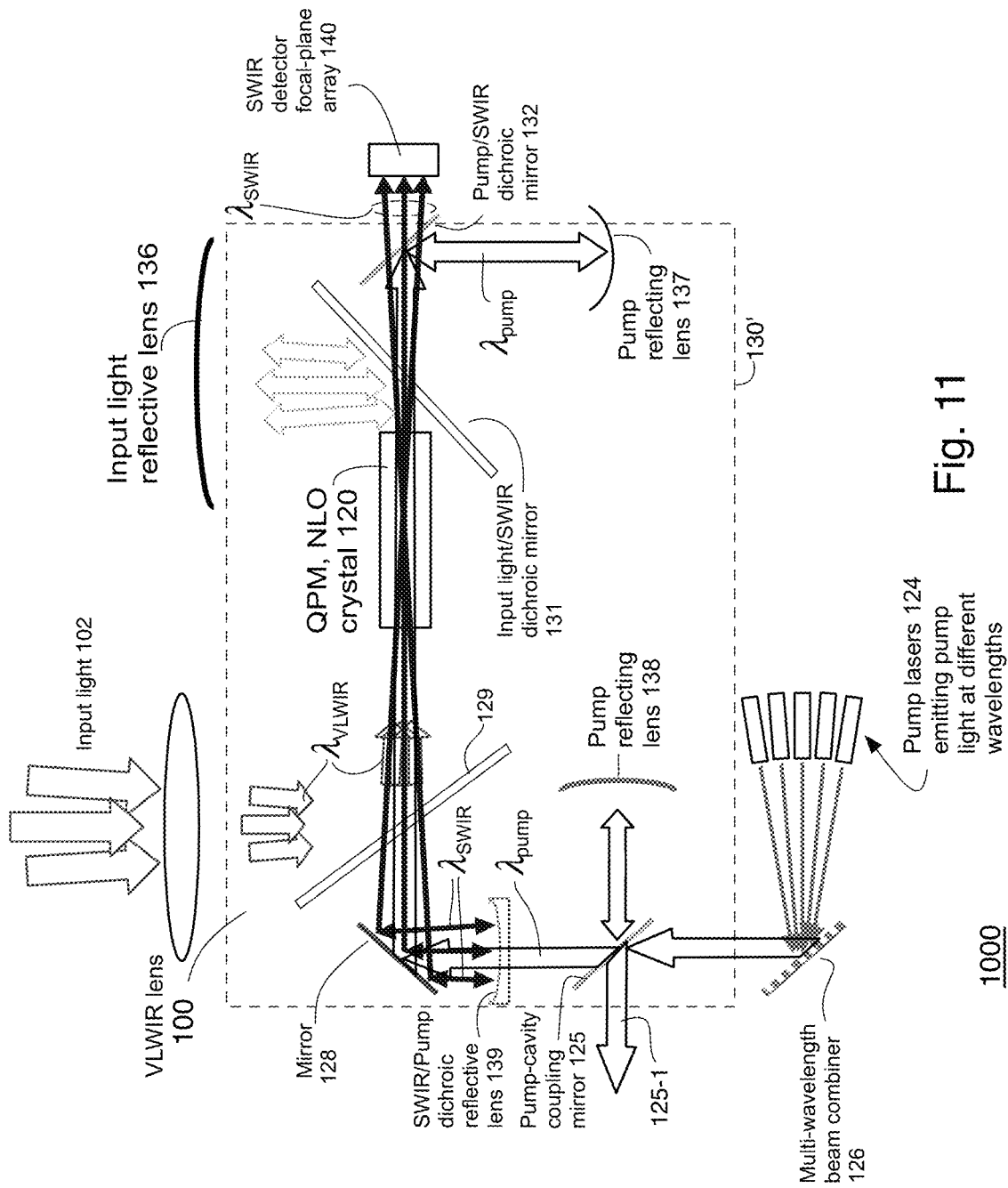
FIG. 11 depicts an embodiment of an up-conversion imager with pump light circulating in a bi-directional optical cavity.

In some embodiments, the imager 1000 locates the NLO element 120 within an optical cavity for the pump light (see, for example, the embodiment of FIG. 11). In some embodiments, the imager locates the NLO element 120 within the optical cavity for a laser producing the pump light (see, for example, the embodiments of FIGS. 12a-12c).

In some embodiments, the NLO element 120 comprises orientation-patterned gallium arsenide (OP-GaAs). In some embodiments, the NLO element 120 comprises orientation-patterned gallium phosphide (OP-GaP).

In some embodiments, the NLO element 120 comprises a structure 120$_{SC}$ which comprises a stack of multiple OP-GaAs and/or OP-GaP pieces (forming waveguides) whose stacking direction is perpendicular to the direction of the variation in crystallographic orientation. See, for example, FIGS. 14 and 15).

Figure 12A:
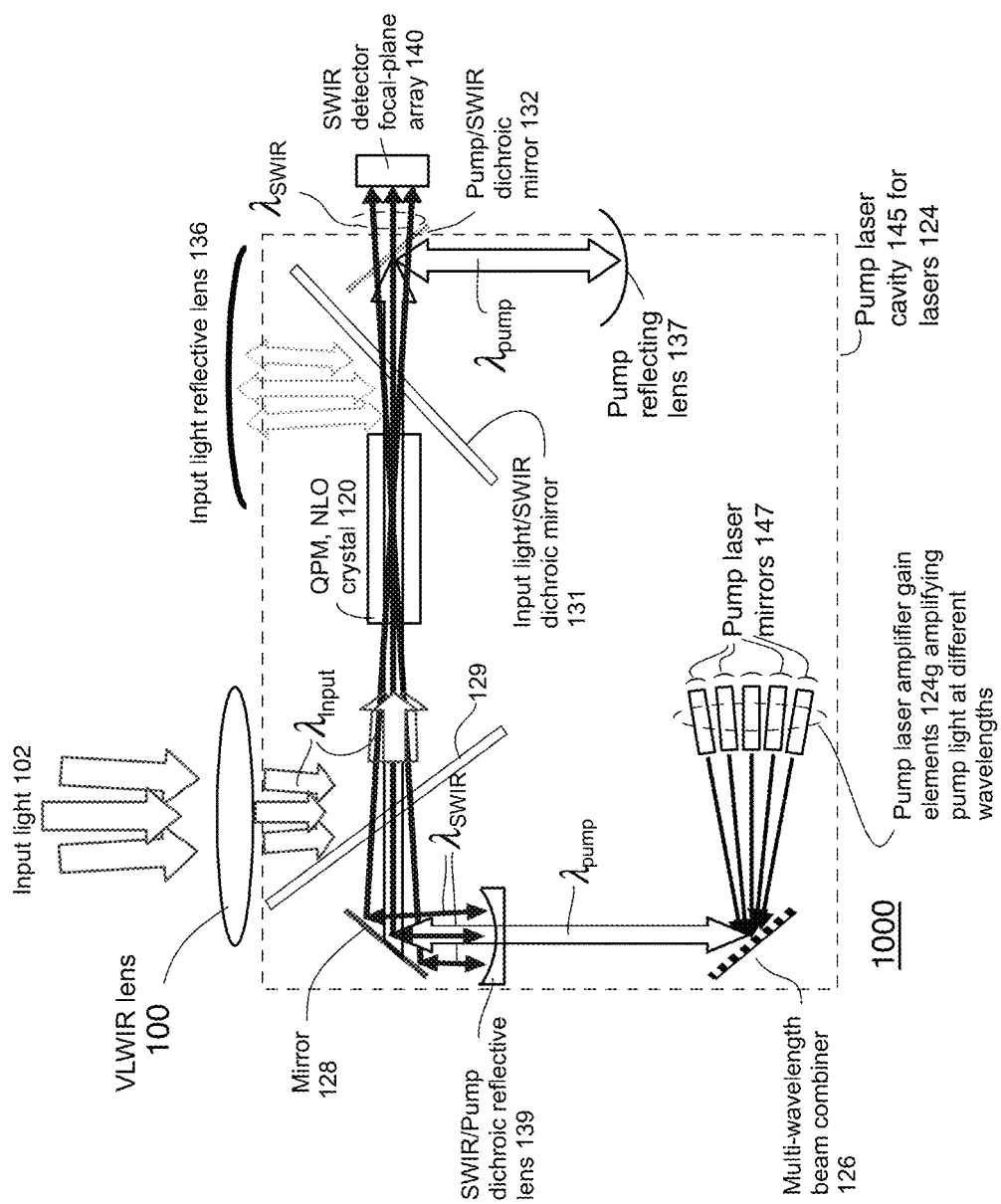
FIGS. 12a, 12b and 12c depict several embodiments of an up-conversion imager that has the NLO element or crystal located within a pump-laser cavity.

In some embodiments, the imager 1000 includes a reflective element that reflects the LWIR/VLWIR light back for a second pass through the NLO element 120 (see, for example, the embodiments of FIGS. 11 and 12a). In some embodiments, the imager 1000 includes a reflective element that reflects the SWIR light back for a second pass through the NLO element. See, for example, the embodiments of FIGS. 11 and 12a.

In some embodiments, the NLO element is located at a focus or focal plane of the input lens system for the VLWIR light. See, for example, the embodiments of FIGS. 6 and 16.

In some embodiments, the NLO element 120 is located at a pupil plane of the input lens system for the VLWIR light. See, for example, the embodiment of FIG. 13.

In some embodiments, the FPA 140 is located at a focal plane of an output lens system for the SWIR light. See, for example, the embodiments of FIGS. 9, 13 and 16.

In some embodiments, the NLO element 120 is located at a pupil plane of the lens system for the pump light. See, for example, the embodiment of FIG. 13.

In some embodiments, the NLO element comprises an array of NLO waveguides. The NLO waveguides are fabricated from the OP-GaAs or OP-GaP material. Embodiments of a NLO element that comprises an array of NLO waveguides are described with reference to FIGS. 13-15 and 17 while methods of making same are described with reference to FIGS. 19a-19e, 20a and 20b.

In some embodiments, the NLO waveguides have entrance portions that are in the form of tapers. These tapers increase the effective numerical aperture of the NLO waveguides. In some embodiments, the imager includes sets of micro-lens arrays for the pump-light, serving to separate and direct the pump light into the narrowed portions of the NLO waveguides. See, for example, the embodiments of FIG. 17, FIGS. 19a-19e, 20a and 20b.

In some embodiments, the disclosed imager 1000 uses a FPA detector 140 embodied as an array of SWIR photodetectors (the photodetectors are not shown individually since FPA detectors and SWIR cameras are available commercially from a number of vendors) to sense the image information of incident LWIR/VLWIR input light 102 instead of using an array of detectors that sense the LWIR/VLWIR photons. Such LWIR/VLWIR photon detectors typically must be cooled to cryogenic temperatures in order to achieve low detector-produced noise (or dark current). The SWIR photodetectors can, in contrast, be operated at room temperatures and the noise of the up-conversion imager 1000 is comparable to or even lower than if the cryo-cooled LWIR/VLWIR photon detectors were utilized instead. The avoidance of cryogenic coolers can result in improved reliability, lifetime of operability, portability and duration of operation for the disclosed imager compared to prior imagers for LWIR/VLWIR input light 102. The FPA detector 140 may be implemented by a SWIR camera, if desired.

The SFG process in the NLO element 120 preserves the relevant image information such as the wave-propagation direction, the relative phase, the relative optical-frequency, the polarization, and the relative photon quantity of the input LWIR/VLWIR light 102 and transfers that information to the generated SWIR light. Thus, the SWIR image projected onto the SWIR FPA detector 140 has the relevant image information that would have been in a LWIR/VLWIR image that might have been projected onto a LWIR/VLWIR FPA by an input lens system of a prior art imager. A SWIR lens system 135 may be utilized in some embodiments in connection with projecting the SWIR image onto the SWIR FPA detector 140.

Many chemicals and especially vapors have characteristic absorption and reflection spectra at the LWIR/VLWIR range. At the LWIR/VLWIR range, there is substantial black-body emission from ambient terrestrial sources. Thus, there is substantial ambient illumination even at night for observation of these spectral signatures. A multi-color or multi-spectral imager in accordance with the present invention that senses LWIR/VLWIR light (at night, for example) and that can operate with low noise and without the necessity of having to be cooled to cryogenic temperatures can provide much of the same ease of operation that a multi-color, visible-wavelength, ambient-illuminated imager provides in the daylight. Not having to be cooled to cryogenic temperatures means that the imager 1000 can be transported by a human being or the imager 1000 can even be worn as head gear (with pump lasers and power supplies located somewhere else, such as in a backpack) whereas the need for cryogenic cooling in prior art imagers causes a prior art imager to be much more complex and much less human-transportable.

The disclosed imager is especially suitable for applications that involve a narrow angular field of view (such as ≤±1°). Such applications typically involve observing very distant objects.

FIG. 6 illustrates a single-pass embodiment of an imager 1000 in which the input VLWIR/LWIR input light ($\lambda_{Input}$) 102 and the output SWIR light ($\lambda_{SWIR}$) make only a single pass through the NLO crystal 120. In this embodiment and in other embodiments of other figures, the input lens system 100 and the NLO crystal 120 have effectively the same optical axis (after the input light 102 is turned 90° by mirror 129 in this and the other embodiments so that the axis of the input light 102 then aligns with the optical axis of the NLO crystal 120). Also, the pump light from lasers 124 is coupled into the NLO crystal 120 so that it too is aligned along that same optical axis (due to the presence of beam combiner 126 and mirror 128 in this and the other embodiments). The pump light ($\lambda_{pump}$) from pump lasers 124 is also coupled into the NLO crystal 120 by passing through dichroic mirror 129 (with no change in direction for the pump light), as is depicted for this and the other embodiments. Incident or input 102 light from different source-image locations are incident upon the input lens system 100 at slightly different angles relative to the optical-axis of input lens system 100 and the optical-axis of the NLO crystal 120 (after the input light 102 is reflected from dichroic mirror 129). The generated SWIR light exits the NLO crystal 120 with the same (or nearly the same) angle relative to its optical axis as the input light 102 entering input lens system 100 and the NLO crystal 120. A portion of the NLO crystal 120 may be located at the focal plane of the input lens system 100, if desired. In such a configuration, the spatial spread of the input light 102 may need to be minimized. The spatial position of the generated SWIR light incident upon the FPA 140 is indicative of the incident angles of the input light 102 and thus the spatial pattern (or source-image information) of the generated SWIR light is indicative of the spatial and angular pattern (or source-image information) of the incident light 102. The angular spread of the incident light 102 is diagrammatically depicted in FIG. 6 (and in other figures) by the presence of three arrows incident upon lens 100 and at the input to the NLO crystal 120. The SWIR light (with wavelength $\lambda_{SWIR}$) generated by the NLO crystal 120 maintains the angular spread so that the spatial position of the generated SWIR light incident upon the FPA 140 is indicative of the incident angle of the input light 102 as mentioned above. Of course, the numbers of incident angles will likely be far greater than the three arrows used to represent the light. So three arrows are used in the figures, for ease of illustration, to indicate a range of possible incident and SWIR light angles.

In general, the incident light from each of the incident angles would fill the aperture of the input lens 100. Each of the three arrows representing the incident light 102 would have a different angle with respect to the optical axis of the input lens. So, to be more accurate, wider arrows having a width that is equal to or larger than the width of the input lens 102 could have been used with those different arrows tilted at different angles. But then it would have been difficult for a reader to visually distinguish those arrows from each other. The arrows for the incident light (and for other light paths as well, such as for the up-conversion generated SWIR light) are drawn more narrowly simply to make them easily distinguishable by the reader.

A dichroic mirror 131 located between the NLO crystal 120 and the SWIR FPA 140 diverts the un-used incident light away from the SWIR FPA 140 and towards a light dump 134. Similarly, another dichroic mirror 132 located between the NLO crystal 120 and the SWIR FPA 140 diverts the un-used pump light away from the SWIR FPA 140 and towards a pump light dump 133. Thus, this up-conversion imager 1000 avoids the shot noise associated directly with the remaining intense pump light (or the incident incident VLWIR light), which is (are) not detected since that light is preferably not sent to FPA detector 140 due to the presence of dichroic mirrors 131 and 132. Some practicing the present invention may opt to combine the functions of mirrors 131 and 132 into a single mirror in which case the functions of light dumps 133 and 134 could be similarly combined into a single light dump for such single mirror.

A NLO crystal 120 may exhibit Quasi-Phase Matching (QPM), but not all NLO crystals exhibit QPM. QPM is achieved by fabricating the NLO structure with periodic changes in the material which limits the spectral bandwidth over which the non-linear optical process (being the sum-frequency generation mentioned above) is obtained. The periodic changes in the present embodiments involve crystallographic-orientation (phase) reversals. A result of utilizing a QPM LNO crystal is that the selective sum-frequency generation can be achieved along with changing the specific wavelengths of the input light for which the NLO process is obtained such that the output light is within the spectral sensitivity range of the photodetector (in the imaging focal-plane array 140) by changing the wavelength of the pump light. This is what gives the disclosed apparatus a "spectrometric" property.

Figure 6A:
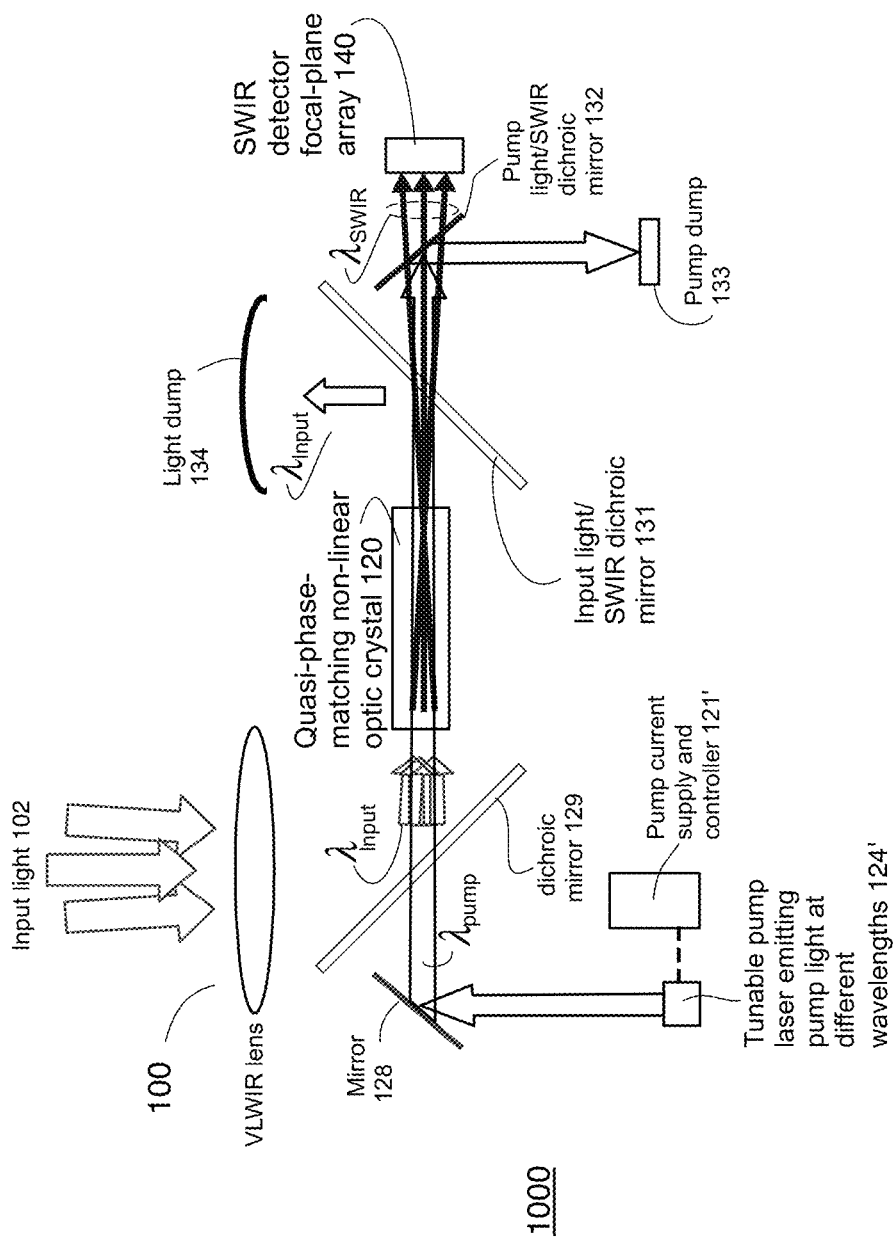
FIG. 6*a* depicts a modification to the embodiment of FIG. 6 where a single frequency-tunable pump laser is utilized instead of a bank of single-frequency pump lasers.
Figure 7:
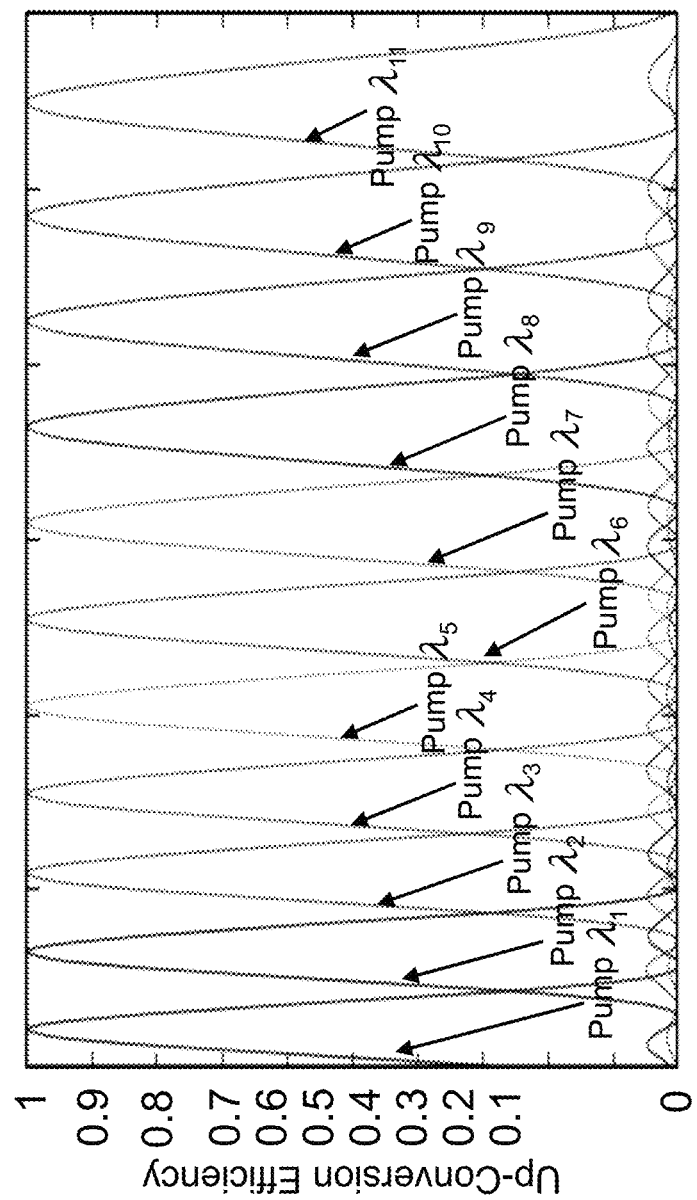
FIG. 7 illustrates up-conversion spectral coverage for various pump wavelengths.

Because the NLO material is dispersive, the refractive index of the NLO material (such as GaAs and GaP) of the NLO crystal 120 can be different for different values of the optical-wavelengths (or optical frequencies) of the light applied thereto. The refractive index is different since the wavelengths of the VLWIR/LWIR light, the SWIR light and the pump light are quite different from each other. Indeed, the wavelength of the input LWIR/VLWIR light 102 is preferably a factor of 5-10 times greater than the wavelength of the up-conversion generated SWIR light. The Quasi-Phase Matching (QPM), which is accomplished by providing periodic crystallographic-orientation reversals in the NLO crystal 120, applies over only a limited range of VLWIR (or LWIR or MIR) input light wavelengths for a given pump 124 wavelength. FIG. 7 illustrates an example of the up-conversion efficiency spectra achieved for different values of the pump wavelength in a NLO crystal 120 having a constant period for its crystallographic-orientation reversals. The embodiments of the up-conversion imager 1000 illustrated in FIGS. 6, 9-13 and 15 have multiple pump lasers 124, with each pump laser emitting a different wavelength. The embodiment of FIG. 6a has a single variable frequency (and thus variable wavelength) pump laser 124' capable of emitting the same wavelengths (for example) as the embodiments of FIG. 6, 9-13 or 15. The pump wavelengths generated by the bank of lasers 124 or by tunable laser 124' could correspond to the wavelengths $\lambda_1$-$\lambda_{11}$ indicated in FIGS. 7 and 8. The combination of pump wavelengths enables the imager to cover a broader range of LWIR/VLWIR input light wavelengths. The spectral bandwidth over which the up-conversion efficiency is 0.5 depends on the length of the NLO crystal 120 and on the dispersion characteristics of the NLO material (such as GaAs and GaP) and on the VLWIR wavelength. Examples of that spectral bandwidth could range from 50 nm to 500 nm. Eleven pump lasers 124 cover a LWIR/VLWIR wavelength sensing range as is described above with reference to FIGS. 7 and 8, it being understood that other numbers (than eleven) of pump lasers 124 may be utilized in other embodiments or one or more tunable lasers 124' may be utilized instead in still other embodiments.

The light from the bank of pump lasers 124 can be combined into a single beam by means of a multi-wavelength beam combiner 126. An example of such a multi-wavelength combiner 126 is an optical grating. The beams of light, having different wavelengths, from the different pump lasers 124 are aligned at different angles relative to the axis of the grating combiner 126 so that those beams exit the combiner preferably at the same angle and also preferably spatially overlap. If a single tunable laser 124' is utilized instead, then a multi-wavelength beam combiner 126 should be unnecessary.

Figure 8:
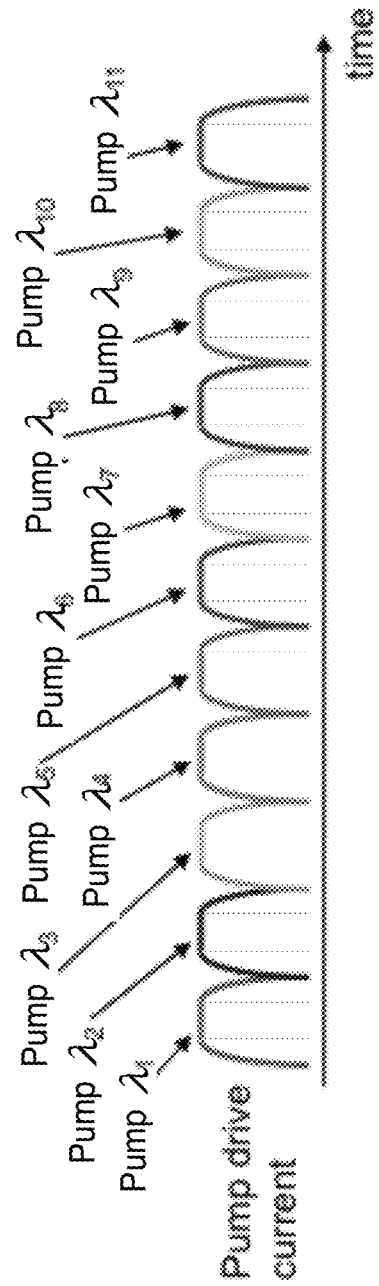
FIG. 8 illustrates exemplary pump-control current waveforms.

The embodiment of the imager 1000 depicted in FIG. 6 also includes a controller 121 that controls when a particular pump laser 124 is active and is supplying pump light to the NLO crystal 120. FIG. 8 shows an example of the pump-laser drive currents from controller 121 for successively activating different pump lasers 124 at different times to essentially sweep the input light 102 wavelength coverage of the imager 1000. Such a pump-laser activation pattern enables the imager to operate as a spectrometer, with the wavelength-specific 2-dimensional image information for different wavelengths output from the FPA 140 of imager 1000 at different times, thereby providing 3-dimensional multi-spectral information.

FIG. 8 illustrates the bank of pump lasers 124 as being activated one at a time. Such an activation scheme enables the imager 1000 to function as a spectrometer. The image information produced by the detector FPA 140 at a given time corresponds to a narrower range of input LWIR/

VLWIR wavelengths for which the wavelength of the particular pump laser being activate is quasi-phase-matched effectively by the NLO crystal 120. As different pump lasers 124, which emit light at different pump wavelengths, are activated, images corresponding to different subsets of the overall range of input LWIR/VLWIR wavelengths are produced by the detector FPA 140. Although the various pump lasers 124 (with pump wavelengths $\lambda_1$-$\lambda_{11}$) are depicted in FIG. 8 as being activated one at a time, any combination of pump lasers could be activated at a given time, as controlled by the controller 121. In fact, all of the pump lasers 124 could be activated simultaneously, if desired. The number of lasers in the bank of lasers 124 may be selected as needed according to the range of wavelengths of the input light 102 to be analyzed.

Instead of using a bank of pump lasers 124, a single (or more than one) frequency-tunable laser(s) 124' may be substituted therefor in the various embodiments. FIG. 6a depicts a modification to the embodiment of FIG. 6 where one frequency-tunable pump laser 124' is utilized instead of a bank of single frequency pump lasers 124. Controller 121' controls the frequencies emitted by the frequency-tunable laser 124' of FIG. 6a.

Figure 9:
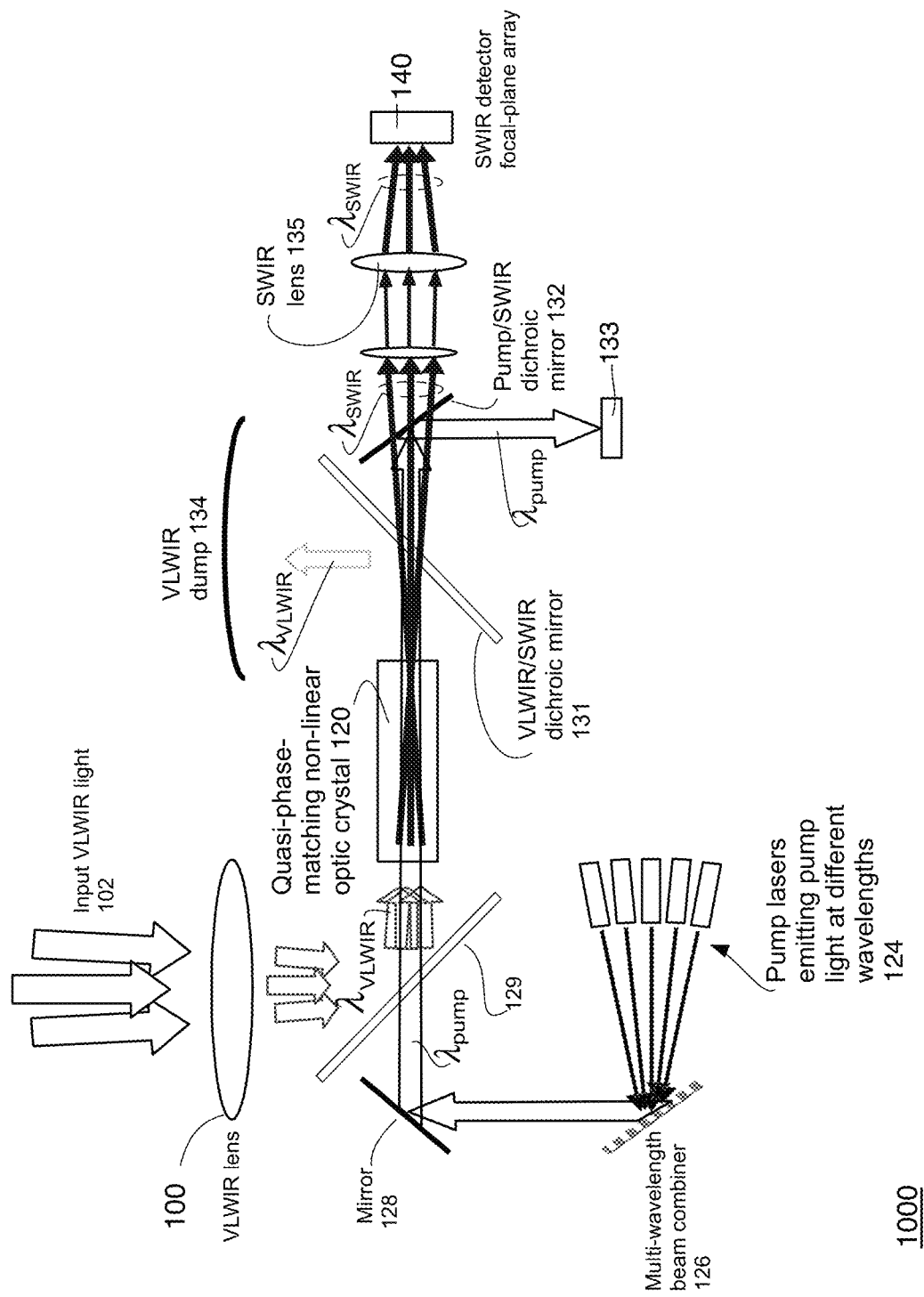
FIG. 9 depicts an embodiment of an up-conversion imager which includes an output lens for directing the SWIR light onto a SWIR detector array.

FIG. 9 shows an embodiment of an up-conversion imager 1000 that has an output lens system 135, comprising one or more output lenses, for the SWIR light ($\lambda_{SWIR}$) that produce on the SWIR detector focal-plane array (FPA) a SWIR image corresponding to the input VLWIR image 102. Otherwise the embodiment of FIG. 9 is basically the same as the embodiment of FIG. 6, so only the differences between the two embodiments are discussed here. The addition of one or more optical elements or lenses 135 may allow the SWIR FPA 140 to be physically smaller and to have smaller detector elements as well as smaller inter-element spacing. One possible benefit of the smaller detector elements is a faster response. Another possible benefit is the ability to obtain arrays that have more elements, for improved image detail detection.

Figure 10:
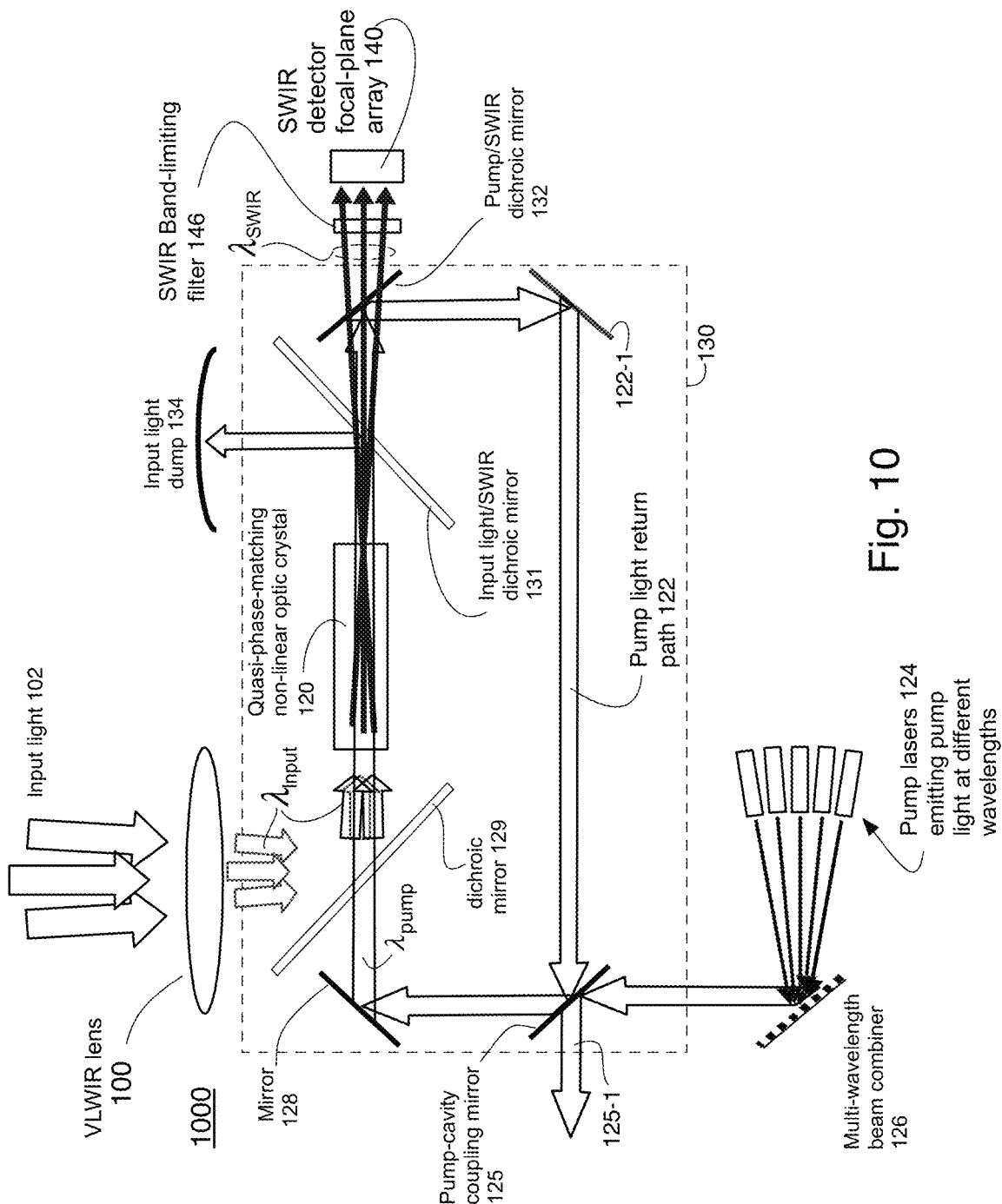
FIG. 10 depicts an embodiment of an up-conversion imager where pump light circulates in an optical ring cavity.

To achieve efficient up-conversion of the input light 102 into SWIR wavelength light, the optical power density of the pump light should be be quite high and the optical field of the pump light propagating in the NLO crystal 120 should overlap with the optical field of the input light propagating in the same NLO crystal 120. FIG. 10 illustrates an embodiment of an up-conversion imager 1000 in which the pump light circulates in an optical ring cavity 130 containing the NLO crystal 120 as well as elements 128, 129, 131, 132, 122-1 and 125. Any un-used pump photons that exit the NLO crystal 120 are re-circulated through the optical cavity for another pass through the NLO crystal 120 by means of an optic pump light return path 122 from dichroic mirror 132 to a pump-cavity coupling mirror 125 in cavity 130. Path 122 may include a mirror 122-1 or other optical elements to complete the path to pump-cavity coupling mirror 125. As a result of this modification to the embodiment of FIG. 6, the intensity of the pump light in the pump-cavity can be much higher than the intensity of the pump light produced by the pump lasers 124 alone. With such a pump-cavity design, the primary losses for the pump light are from the up-conversion process in the NLO crystal 120, from any absorption of the pump light in the NLO crystal 120 (such as through two-photon absorption processes), and from being coupled out of the cavity through the pump-cavity coupling mirror 125 (pump light losses at mirror 125 are denoted by arrow 125-1). In some embodiments, the reflectivity of the pump-cavity mirror 125 can be set to achieve a critical-coupling or slight over-coupling condition, so that the intra-cavity pump power is maximized.

Figure 12B:
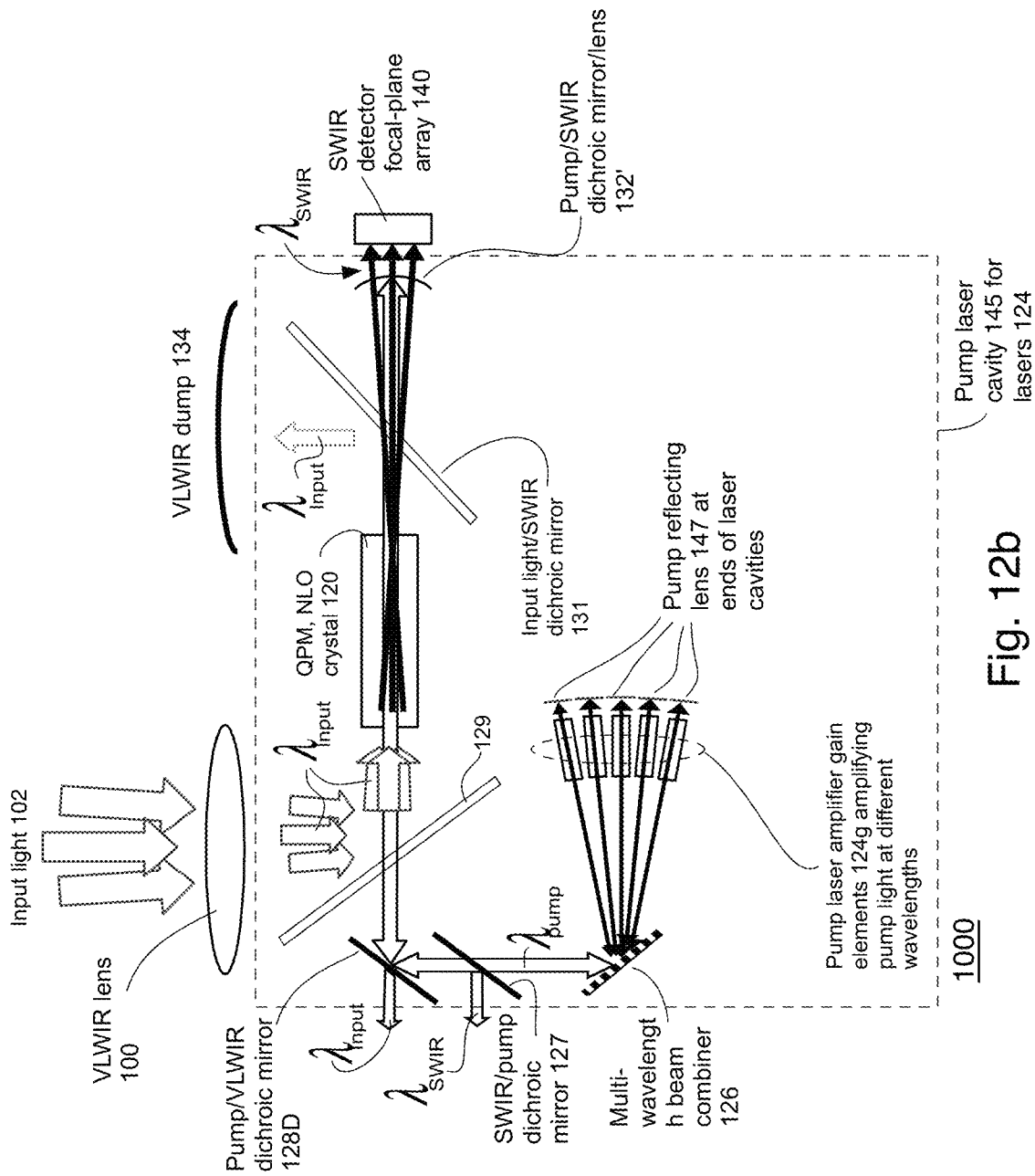
Figure 12C:
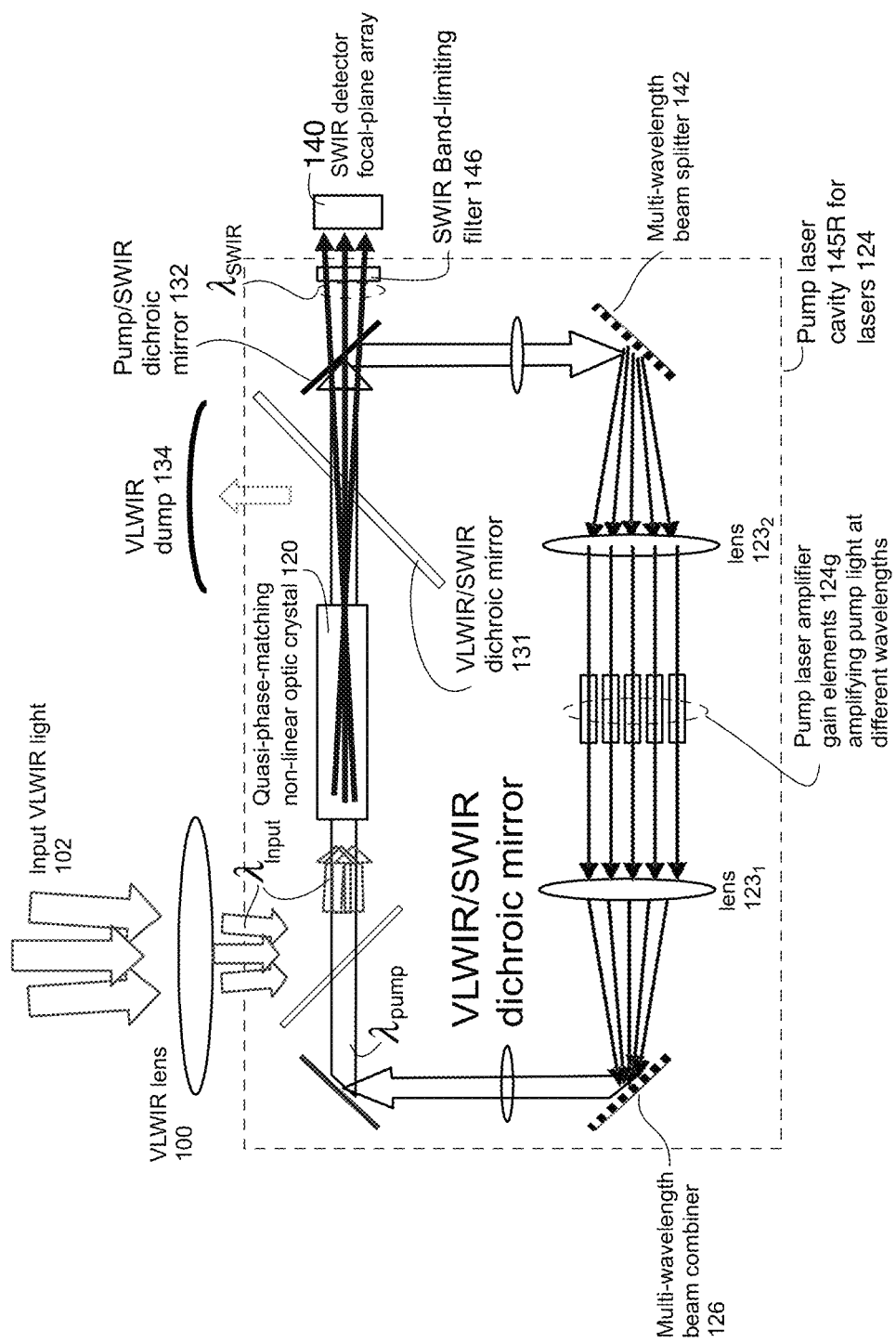

FIG. 12c depicts ring cavity embodiment where the lasers 124 themselves are disposed in a single optical cavity 145 arranged as a ring.

Intense pump light propagating through the NLO crystal 120 could result in non-negligible generation of LWIR/VLWIR light in the NLO crystal 120 as a result of a spontaneous parametric generation process (parametric fluorescence or parametric down-conversion) that can occur even when there is no input light 102 supplied to the NLO crystal 120. See J. S. Pelc, et al., "Influence of domain disorder on parametric noise in quasi-phase-matched quantum frequency converters," *Optics Letters*, v. 35, n. 16 (2010), p. 2804. The spontaneously generated LWIR/VLWIR light can then be up-converted, with the assistance of pump light, in the same way as the input light 102. When the wavelength of this up-converted, spontaneously generated light is within the range of wavelengths absorbed by the SWIR detector of the FPA 140, that portion of up-converted light contributes noise and the photo-generated detector current from those noise photons contributes to an equivalent dark current of the photodetector. As such, the embodiment of FIG. 10 also depicts an optional band-limiting filter 146 that may be located before the SWIR detectors of the FPA 140 and that transmits only the spectral range of SWIR photons that could be up-converted from the anticipated range of input light 102 photons and the pump light photons. Such a band-limiting filter 146 can reduce the noise photons that contribute to the equivalent dark current.

Otherwise the embodiment of FIG. 10 is the same as the embodiment of FIG. 6, so only the differences between the two embodiments are discussed above. Moreover, the modification suggested by FIG. 9 (the addition of SWIR lens 135) may also be implemented as a modification to the embodiment of FIG. 10 and other embodiments, if desired.

FIG. 11 shows another embodiment of an imager 1000 but with a linear optical cavity 130'. In this embodiment, the pump light likewise can make multiple passes through the NLO crystal 120 but some of those passes are in one direction through crystal 120 and other passes are in the opposite direction. The embodiment of imager 1000 illustrated by FIG. 11 also includes an input light reflective optical element or mirror 136 (instead of the light dump 134 of other embodiments) that causes the input light (not up-converted after the first pass through the NLO crystal 120) to make a second pass through the NLO crystal 120, in a direction opposite from that of the first pass through NLO crystal 120. The optical element 136 also may refocus the input light to reduce the beam width of the second-pass light, if desired. Instead of the depicted curved mirror for element 136, element 136 may alternatively comprise a flat mirror and a lens. The imager 1000 illustrated in this FIG. 11 also includes one or more additional reflective optical element(s) 139 that cause the SWIR light up-converted from the second pass of the input light to make a second pass through the NLO crystal 120 and then onto the SWIR-detecting FPA 140. These additional reflective element(s) 139 could include a dichroic reflecting capability such that only the SWIR light is reflected but the pump light is transmitted through element(s) 139. These additional element(s) 139 also may refocus or collimate the SWIR light as needed for producing a desired SWIR image at an image plane of the FPA 140, if desired.

In the imager 1000 embodiment of FIG. 11 the pump light may be reflected back by pump reflecting lenses 137 and 138.

FIGS. 12a, 12b and 12c illustrate several embodiments of an up-conversion imager 1000 in which quasi-phase-matching (QPM), non-linear optical (NLO) crystal 120 is located within a shared laser cavity 145 for each of the pump lasers. Each pump laser 124 in the shared cavity 145 has an associated gain element 124g for the pump light produced by each pump laser 124. For the embodiment illustrated in FIG. 12a, each pump laser in the shared cavity 145 has an associated reflecting lens 147 associated with it. Each reflecting lens 147 may include additional constructs to select a specific range of wavelengths that can be produced by that pump laser corresponding, for example, to the different wavelengths discussed above with reference to FIG. 8. These constructs may include known diffractive elements and/or distributed Bragg reflectors. These reflecting lenses 147 define one end of the "linear" optical cavity 145 for the pump lasers. As illustrated in FIG. 12a, the opposite end of the optical cavity 146 is defined by a second pump reflecting lens 137 that is shared by multiple pump laser gain elements 124g. In the embodiment of FIG. 12b, a shared reflective element or mirror 132' performs this pump light reflecting function. The portion of the optical cavity 145 that is between and including dichroic mirror 132' and combiner 126 is shared among the various pump lasers 124. Thus, the NLO crystal 120 is located within the optical cavity of each pump laser 124. The portions of cavity 145 that are between combiner 126 and the individual pump-reflecting lens 147 are specific to each of the pump lasers 124.

The embodiment of imager 1000 depicted by FIG. 12b is similar to the embodiment of imager 1000 depicted by of FIG. 12a. As illustrated by FIGS. 12a and 12b, these embodiments of imager 1000 have the following elements in common: the shared optical cavity 145 for which a given pump laser includes a separate pump reflecting lens 147 at one end of the shared optical cavity 145, a separate gain element 124g, a shared multi-wavelength beam combiner 126, one or more shared dichroic reflective elements 129 & 131 that pass the SWIR and pump light but reflect the VLWIR/LWIR input light 102, a shared quasi-phase-matching NLO element 120, and a shared reflective element 137 or 132' for the combined pump light at the other end (light-wise) of the optical cavity 145.

The embodiment of FIG. 12a also includes a dichroic reflective element 132 that passes the up-conversion generated SWIR light to the SWIR detector array 140 and reflects the pump light onto a pump-reflecting lens 137. However, an analogous combination of functions may be accomplished, for example, by elements depicted in FIG. 12b, which include a dichroic reflective lens 132' that reflects the pump light (at the opposite end of the laser cavity 145 from the NLO crystal 120) and passes the up-conversion generated SWIR light onto the SWIR detector array 140, as depicted in FIG. 12b.

The embodiment of FIG. 12a also includes dichroic reflective lens element 139 that passes the pump light but reflects the SWIR light generated by the up-conversion process which element 139 is preferably disposed light-path-wise between the multi-wavelength beam combiner 126 and dichroic reflective element 129. The LWIR/VLWIR input light 102 and the up-conversion generated SWIR light are preferably not coupled to the gain elements 124g of the pump lasers 124. The pump/SWIR dichroic reflective lens element 139 depicted in the embodiment of FIG. 12a selectively reflects the up-conversion generated SWIR light and passes the pump light onto the gain elements 124g of the pump lasers. Likewise, pump/SWIR dichroic mirror 127 depicted in the embodiment of FIG. 12b selectively reflects up-conversion generated SWIR light and passes the pump light onto the gain elements 124g of the pump lasers. Mirror 128 depicted in the other embodiments is preferably a dichroic mirror in this embodiment (FIG. 12b) and hence is labeled with an added letter 'D' (as 128D). Dichroic mirror 128D reflects pump and SWIR light while passing the input light (LWIR/VLWIR light). Also, preferably, only the up-conversion generated SWIR light is coupled out of the laser cavity 145 and onto the detector array 140 of the imager 1000. For the embodiment of imager 1000 depicted by FIG. 12a, the up-conversion occurs for both forward and reverse passes of the LWIR/VLWIR light through the NLO crystal 120. In the embodiment of FIG. 12b, the up-conversion occurs only for the forward pass of the LWIR/VLWIR light through the NLO element 120. However, since pump light is propagated in both directions through the NLO element 120, there could be some spontaneous parametric generation of up-converted and down-converted light in the reverse direction.

FIG. 12c depicts another embodiment of imager 1000 in which the up-conversion occurs only for the forward pass of the LWIR/VLWIR light through the NLO element 120. For this embodiment, the pump lasers have a shared ring cavity 145R, instead of the shared linear cavity 145 of the pump lasers utilized in the embodiments of FIGS. 12a and 12b. When there are multiple pump lasers whose light is coupled into the same NLO element 120, the embodiment of imager 1000, as illustrated by FIG. 12c, has means 126, $123_1$ to combine their light into a common pump beam comprising the light emitted from the multiple gain elements 124g (a different gain element 124g is associated with each of the pump lasers 124 that emits pump light of a different wavelength from the other pump lasers). The imager 1000 of this embodiment also has means 142, $123_2$ to separate the combined beam of pump light into separate wavelength-specific beams that are then coupled into the associated different gain elements 124g of the multiple pump lasers. For the embodiment of an imager 1000 illustrated by FIG. 12c, means for producing a shared laser cavity 145R that contains multiple gain elements $124_g$ also includes diffractive elements (such as gratings) 126, 142 and refractive lenses $123_1$ and $123_2$. The uni-directional flow of the pump light, as well as the uni-directional flow of the VLWIR/LWIR light through the NLO element 120 in this embodiment ensures that the up-conversion generated SWIR light is directed only towards photodetector array 140. A SWIR/pump dichroic mirror 132 in the ring cavity 145R transmits the SWIR light toward the photodetector array 140 and reflects the unused pump light back toward the gain elements 124g via multi-wavelength splitter 142 and refractive lens $123_2$.

Having the NLO element 120 located within the shared laser cavity 145 or 145R of the pump lasers improves the efficiency of the pump lasers 124. This feature can be deduced from comparing the imager embodiments of FIGS. 12a, 12b and 12c with the imager 1000 embodiments of FIGS. 10 and 11. For the imager 1000 embodiments of FIGS. 10 and 11, the pump lasers 124 are depicted as being located outside the optical cavity containing the NLO element 120 and each external pump laser 124 then has its own cavity (the mirrors commonly associated with such lasers are not depicted in these embodiments for ease of illustration and the associated gain elements thereof are not separately labeled). The pump-cavity coupling mirror 125-1, through which the externally-generated pump light is coupled into the optical cavity containing the NLO element 120, has some loss for the pump light such that not all of the pump light produced by the pump lasers 124 is retained in the pump laser cavities or in the optical cavity containing the NLO element 120. In contrast, by having the pump lasers and the NLO element 120 share a common optical cavity 145 or 145R, as illustrated by the embodiments of imager 1000 depicted by FIGS. 12*a*, 12*b* and 12*c*, the primary loss for the pump light may well be just the up-conversion process itself. Thus, the pump light that is not consumed by the up-conversion process in the NLO crystal or element 120 is recirculated in the shared cavity 145, 145R to produce additional stimulated emission of pump light. In general, the percentage of pump photons that is up-converted into SWIR photons is quite small, generally less than 10%, so recirculation of the pump light can contribute significantly to system efficiency. Also, the other losses for the pump light in the laser cavity can be very small. Thus, the gain element 124*g* in a given pump laser produces mainly the pump light that is up-converted into the SWIR light detected by SWIR detector array 140. The common optical cavity 145, 145R includes pump laser amplifiers 124*g* each amplifying light with different wavelengths as discussed above with reference to FIG. 8. In the embodiments of FIGS. 12*a* and 12*b*, one end of the optical cavity 145 is defined by a pump reflecting lens 137 located at the opposite end of the NLO crystal 120 from the pump gain elements 124. The other end of the optical cavity 145 is defined by one or more pump reflecting lens and/or mirrors 147 located at the opposite end of the gain elements 124*g* from the NLO crystal or element 120. Each of the pump laser amplifiers/gain elements 124*g* preferably include some means for pump-wavelength selection such as a grating incorporated in the gain elements 124*g* of the pump lasers 124.

Figure 13:
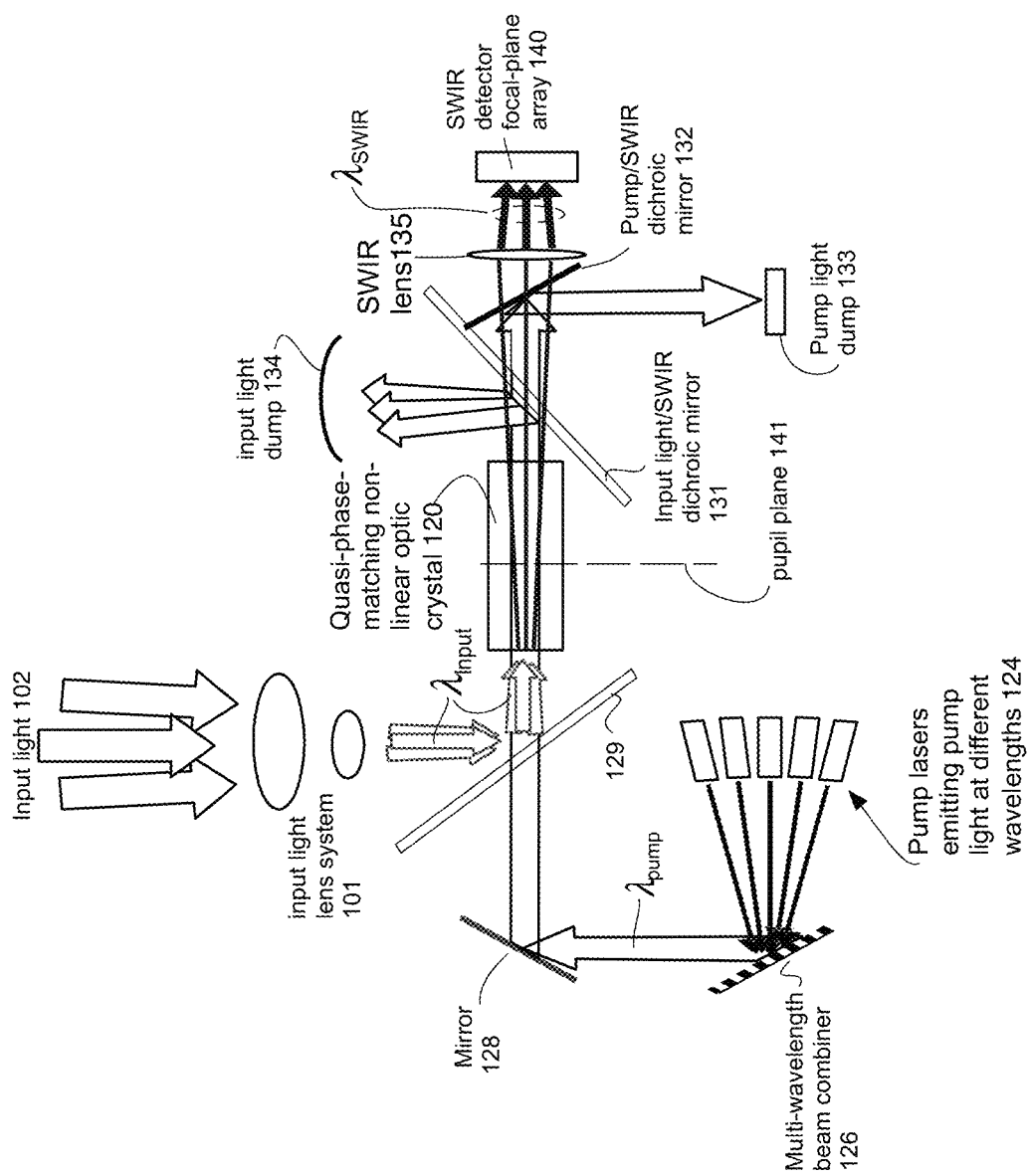
FIG. 13 depicts an embodiment of an up-conversion imager with NLO element or crystal located at a pupil plane of the input lens system.

FIG. 13 illustrates an up-conversion imager 1000 for which a portion of the NLO crystal 124 is located at a pupil plane 141 defined by an input lens system 101. A pupil plane 141 is where the beams of light are collimated, and is depicted at a central portion of the NLO crystal 124. A pupil plane is essentially the conjugate of a focal plane, where the beams come to a focus rather than being collimated. An important feature of this embodiment is that its input lens system 101 (having, for example, multiple lenses) forms spatially overlapping collimated input light beams with reduced angular spread compared, for example, to the other embodiments, and thus enables the input light 102 to remain laterally more concentrated while propagating through a longer length NLO crystal 120 than could be utilized if an input lens system 101 did not collimate the input light 102. FIG. 13 also shows an output lens system 135 that focuses and directs the generated SWIR light onto the detectors of a SWIR FPA 140.

Turning now to the two dimensional waveguided embodiment of NLO element 120 (briefly mentioned above), at present, the maximum thickness of orientation-patterned GaAs or GaP crystals used in single crystal NLO element 120 that have been fabricated is around 1-2 mm, and even smaller when the spatial period of its crystallographic-orientation reversals is shorter. In some embodiments of imager 1000, it may be desirable for the cross-sectional size of the NLO crystal 120 in the up-conversion imager 1000 to be larger than several mm.

Figure 14:
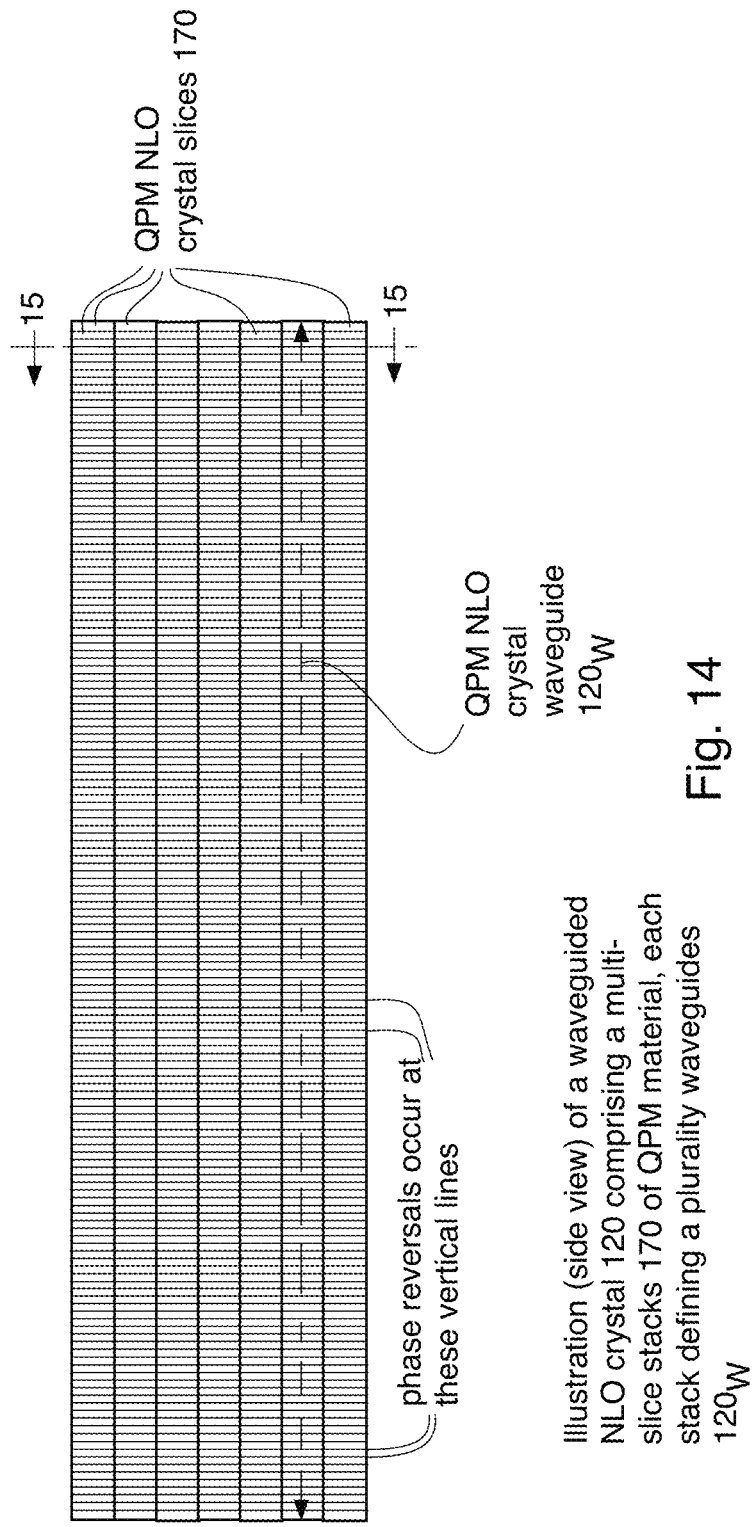
FIG. 14 is a side (or top view) view illustration of an embodiment of a NLO element comprising a multi-slice stack of QPM material.

FIG. 14 illustrates a side view (it may alternatively be considered as a top view) of an embodiment of a waveguided NLO crystal structure 120 that is constructed as a stack of thin slices 170 of quasi-phase matching material such as the orientation-patterned GaAs or GaP crystals. The slices 170 may range in thickness from about 0.005 to 0.5 mm for each slice 170, but preferably range in thickness from 0.01 to 0.2 mm for each slice 170. The thin vertical lines depicted in FIG. 14 represent the periodic phase reversals in the quasi-phase matching NLO material. A stack of slices 170 define the waveguided NLO crystal structure 120. An individual waveguide is labeled 120$_W$ in this view.

Figure 15:
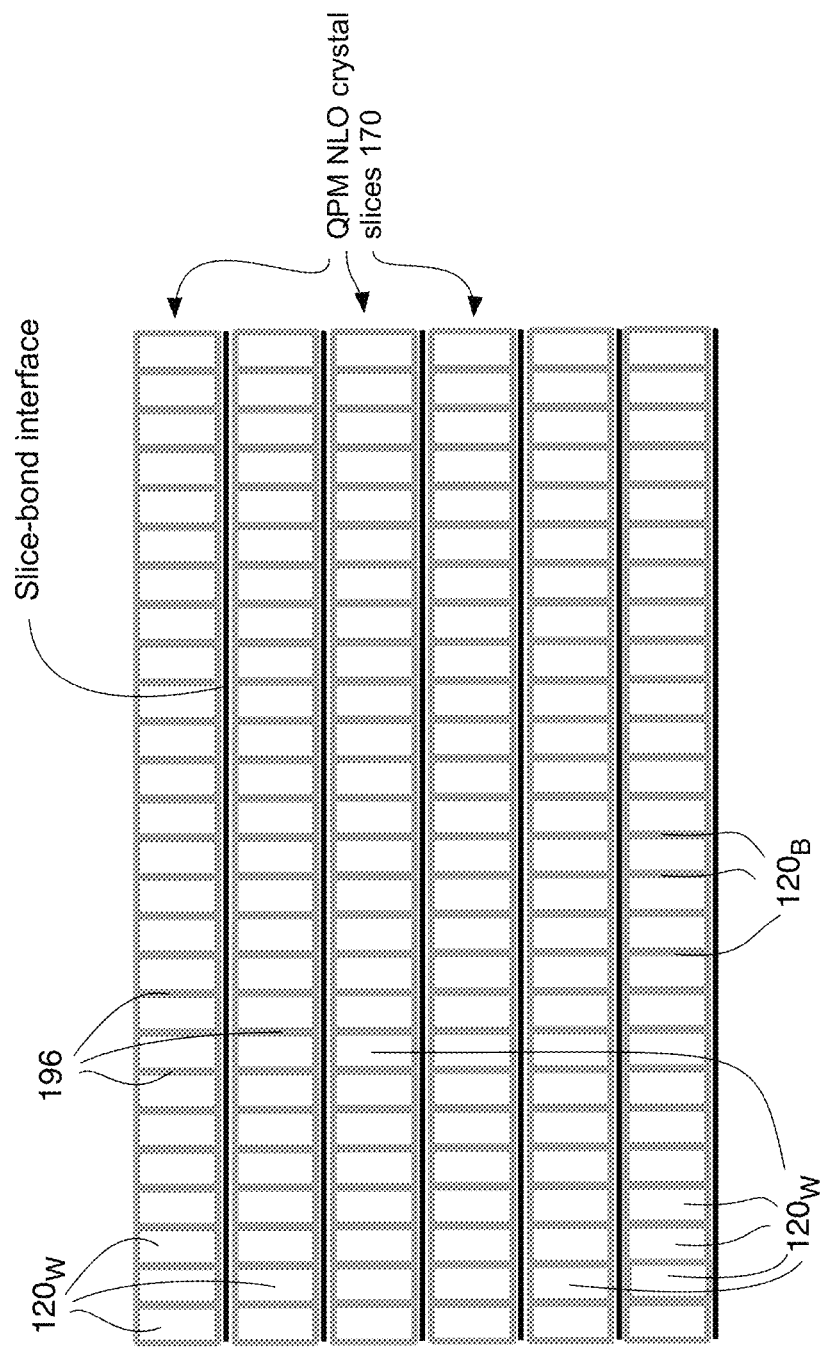
FIG. 15 depicts a possible arrangement of the NLO waveguides in the NLO element or crystal of FIG. 14, depicted as an end view or cross-sectional view thereof.

FIG. 15 depicts a sectional view taken at line 15-15 of FIG. 14 (alternatively it may be viewed as an end of the waveguided NLO crystal structure 120 of FIG. 14). One way of fabricating such a waveguided NLO crystal structure 120 is described in detail subsequently with respect to FIGS. 19*a*-19*e*, 20*a* and 20*b*. Typically, first layer 194 (see FIG. 19*a*) of the orientation-patterned GaAs or GaP crystal on a substrate wafer 190 (that can be removed in later processing), which could be GaAs or AlAs or Germanium for orientation-patterned GaAs material and which could be GaP or ATP or Silicon for the orientation-patterned GaP material. The top surface of that grown QPM layer 194 is then polished flat. Means such as oxide-facilitated bonding or polymer-to-polymer bonds can be used to attach a polished surface of a QPM layer to a polished surface of another QPM layer as is described with reference to FIGS. 20*a* and 20*b*. A second layer is then grown in a similar fashion (on another substrate). Equipment is available for precisely aligning (with sub-micrometer accuracy) the layers 194 of QPM material with each other and then bonding them. After the two QPM layers are bonded together, the substrate 190 of one of those layers may be removed by means such as wet or dry etching and/or polishing to produce a thin slice of the QPM material stacked above the other layer of QPM material. This process may be repeated to form a stack of additional slices 194 of QPM material. The waveguided NLO crystal structure 120 of FIGS. 14 and 15 depicts one possible embodiment for the NLO crystal 120 of the previously discussed embodiments of imager 1000.

To provide channel-waveguide confinement of the light, optical waveguides 120$_W$ are formed in each slice 170 of the waveguided NLO crystal structure 120. One exemplary way to define and fabricate the waveguides in a slice of the 2-dimensional construction of waveguided NLO structure 120 would be to first grow a layer of QPM material 194, such as the orientation-patterned GaAs or GaP, and then polish to flatten the top surface of that grown layer, as mentioned above. See FIG. 15 for a cross-sectional (or end) view of the waveguided NLO crystal structure 120. The waveguides 120$_W$ are oriented to have their length perpendicular to the periodic variation in the crystallographic orientation (as shown by FIG. 14) and the waveguides 120$_W$ are then fabricated by forming deep trenches 195 (see also FIG. 19*b*) through the grown layer 194. Dry etching or wet-chemical etching methods could be used to form these deep trenches. Saw cuts with thin blades also could be used to form the trenches 195. The sidewalls of the trenches 195 can be covered with a low-refractive-material 196 such as silicon-dioxide, silicon-nitride, or a polymer such as polyamide or benzo-cyclo-butene. The VLWIR light, the pump light and also the generated SWIR light is guided in the GaAs or GaP material of the waveguides 120$_W$, which has much higher refractive-index. The low-refractive-index material 196 thus forms waveguide-separation buffers 120$_B$ between adjacent waveguides 120$_W$. The lateral dimension of the waveguides 120$_W$ generally could range from approximately one-half (or even one-quarter) of the VLWIR wavelength to several times the VLWIR wavelength. The lateral dimension of the waveguide-separation buffers $120_B$ generally would be smaller than one VLWIR wavelength.

A 2-dimensional stack of waveguides may be fabricated using methods similar to those described above with reference to FIGS. 14 and 15 as is described in greater detail below with reference to FIGS. 20a and 20b. If the pixels are defined by the waveguides $120_W$ along the vertical direction, in addition to being defined along the horizontal direction, the vertical dimension of the waveguides generally could range from approximately one-half (or even one-quarter) of the wavelength of the VLWIR input light to several times the VLWIR wavelength. Likewise, the vertical dimension of the waveguide-separation buffers $120_B$, would generally range from ¼ to several times the VLWIR wavelength. Although FIG. 15 shows the waveguides arranged in a regular 2-dimensional grid with uniform spacing, non-uniform spacings also could be acceptable in some applications.

Figure 16:
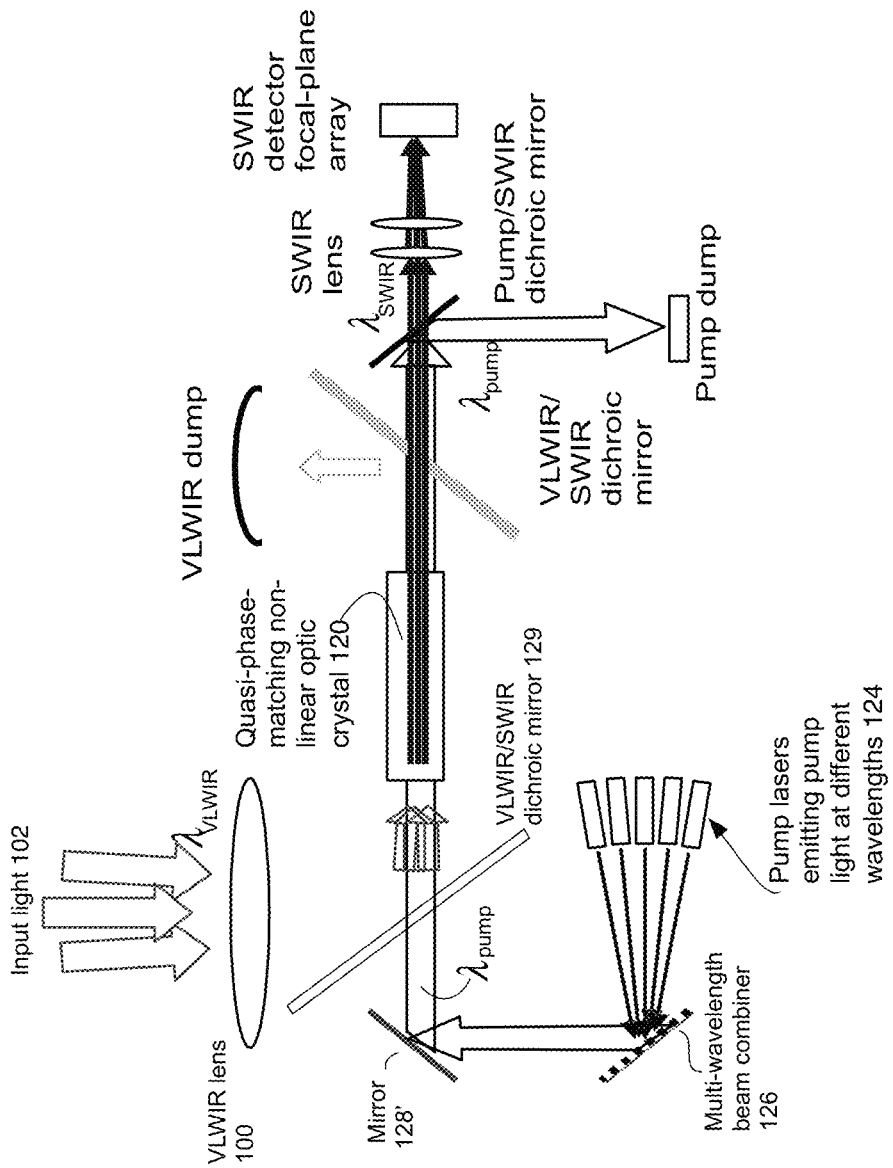
FIG. 16 depicts an embodiment of an up-conversion imager with an input end of the NLO element or crystal located at a focus plane of the input lens system.

FIG. 16 illustrates an embodiment of an up-conversion imager 1000 for which the front end of the waveguided embodiment of NLO crystal structure $120_{SC}$ is located at a focus plane of the input lens system and that NLO crystal structure is implemented as an array of NLO 120 waveguides $120_W$ such as those of FIGS. 14 and 15. It should be noted that an array of NLO waveguides $120_W$ also could be used in the imager 1000 embodiments of FIG. 9, 10, 11, 12a, 12b and/or 12c. In a conventional VLWIR imager that would include a FPA 140 that comprises VLWIR detectors, the VLWIR FPA would be located at the image plane of this input lens system instead of the NLO crystal. The waveguided NLO crystal structure 120 preferably contains an arrangement of optical waveguides $120_W$ (see FIG. 16), with each waveguide $120_W$ comprising a quasi-phase matching structure such as an orientation-patterned GaAs or GaP crystal portion. The waveguides $120_W$ extend through the length of the waveguided NLO crystal 120. FIG. 15 illustrates a possible 2-dimensional arrangement of the waveguides $120_W$. The waveguides $120_W$ may be arranged such that each waveguide $120_W$ corresponds to an image pixel along at least one coordinate axis of the image. For example, each waveguide $120_W$ along the horizontal direction shown in FIG. 15 may represent one pixel along that direction. For the orthogonal coordinate axis of the image, such as the vertical directional shown in FIG. 15, each waveguide $120_W$ may likewise could represent one pixel. Alternatively, the VLWIR input light 102 for multiple pixels, in the vertical direction, could be coupled into each waveguide $120_W$.

When an array of NLO waveguides $120_W$ is used for the NLO element 120, the imager 1000 may have additional optical elements (besides those shown in the figures) such as lenses that serve to shape the beam of pump light and also lenses that serve to focus the input LWIR/VLWIR light 102 onto the NLO waveguides $120_W$ and to direct and focus the up-conversion generated SWIR light exiting those waveguides $120_W$ onto the photodetectors in the focal plane array 140.

Additional slices of NLO waveguides $120_W$ can be formed and stacked one above the other by repeating the steps discussed below and illustrated with reference to FIGS. 19a-19f. FIGS. 20a and 20b illustrate a carrier substrate holding a third slice being aligned and bonded to a base containing a first slice and a second slice of NLO waveguides.

Considering again FIG. 16, an output lens system 135 couples and focuses the SWIR light exiting the NLO waveguides $120_W$ onto the detectors of the SWIR FPA 140. The SWIR FPA 140 may comprise a camera from Raptor Photonics or from Princeton Instruments, for example. SWIR FPA units that are not part of a camera also are available from SpectroLab of Sylmar, Calif., for example. If the NLO crystal 120 comprises a 2-dimensional set of waveguide-pixels $120_W$, as in the case of the waveguided embodiment of element 120 (see FIGS. 14 and 15 as well as FIGS. 19a-19f and 20a and 20b discussed below), the output lens system 135 would serve to re-image that light exiting those waveguides $120_W$ onto the corresponding detector-pixels of the FPA 140. Alternatively, if the NLO crystal 120 comprises a 1-dimensional set of waveguide-pixels $120_W$ (embodied, for example, as a single slice 170), the output lens system 135 would serve to re-image that light exiting those waveguides onto the corresponding detector-pixels of the FPA 140 for the coordinate axis corresponding to the waveguide-defined pixels. For the orthogonal coordinate axis, the output lens system could provide a function like that discussed in reference to FIG. 9.

For an imager 1000 with a waveguide-containing NLO crystal 120, the field-of-view of the imager is dependent on the numerical aperture, or the input acceptance angle, of the waveguides $120_W$. One way to increase the acceptance angle of the waveguides $120_W$, and thus the field-of-view of the imager 1000, is to fabricate the entrance portion of those waveguides with a tapered portion $120_T$, as illustrated (top view) in FIG. 17. The waveguides $120_W$ could then be quite narrow (having a width of one VLWIR wavelength or smaller) over most of the length of the waveguided NLO crystal structure 120. A benefit of having an array of NLO waveguides $120_W$ that concentrate the input light 102 within the area of those waveguides $120_W$ is that the pump light also can then be concentrated within the smaller overall area of the waveguides rather than being spread over the larger area of the NLO crystal 120 and its buffer regions $120_B$. The up-conversion efficiency is dependent on the power density of the pump light. Thus, distributing the pump light over a smaller overall area allows the overall pump power to be reduced while maintaining a desirable pump-power density in those regions of the waveguided NLO crystal 120 where the pump light interacts with the VLWIR light to produce the up-conversion.

Figure 17:
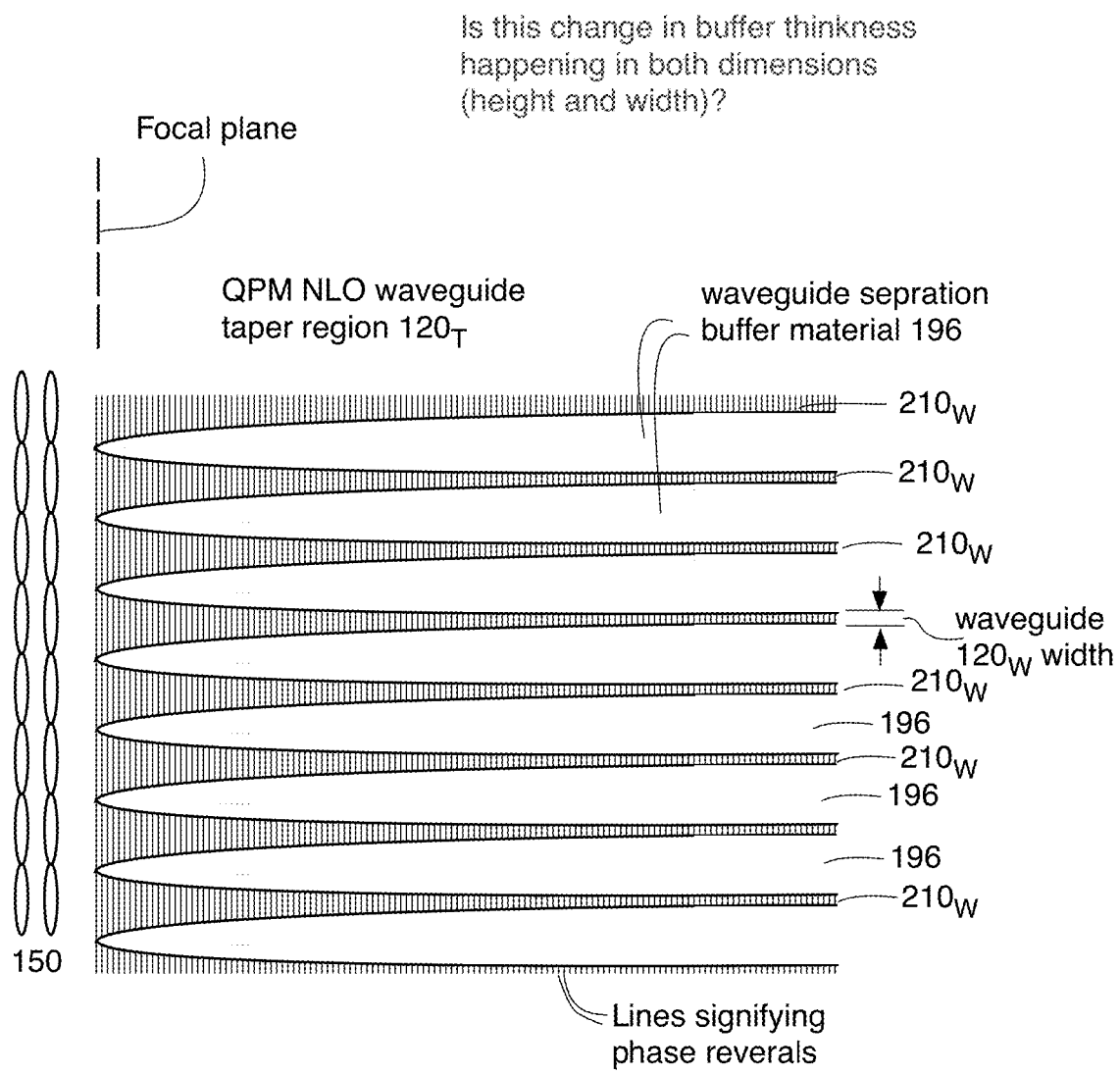
FIG. 17 is a top view illustration of NLO waveguides in the NLO element or crystal that have tapers at their entrance portion.

FIG. 17 also shows sets of micro-lens arrays 150 for the pump light that serve to separate the pump beam into discrete beamlets and then collimate and direct those beamlets into the narrowed portions (see 120width) of the individual NLO waveguides 120W.

Figure 18:
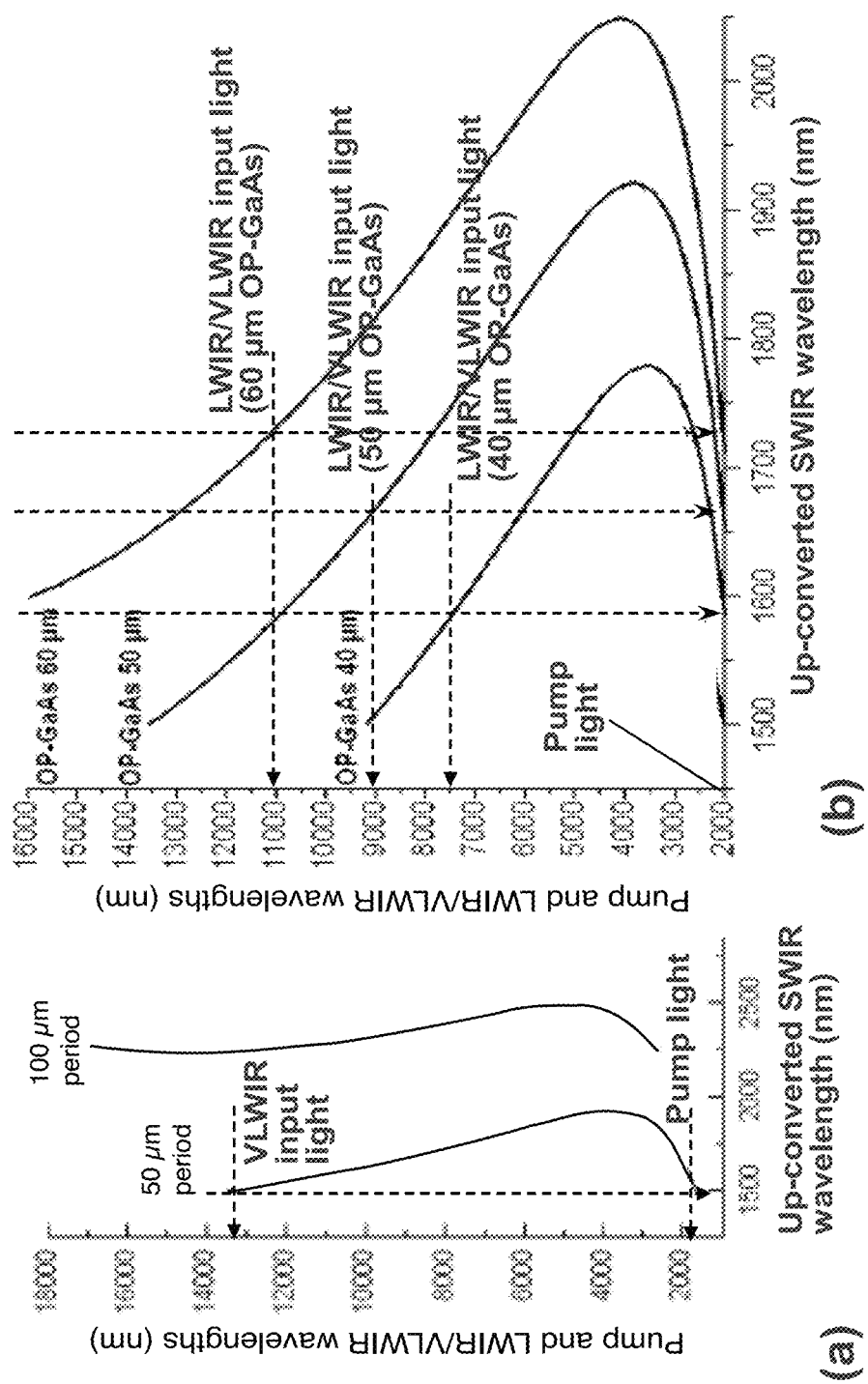
FIG. 18 provides examples of quasi-phase matching curves for orientation-patterned GaAs material and illustration of combinations of VLWIR, pump and SWIR wavelengths obtained for a given spatial period of the crystallographic-orientation reversals.

FIG. 18 illustrates how the period of the QPM crystallographic-orientation reversals and the wavelength range of the pump light can be selected for a given range of VLWIR input wavelengths to the NLO crystal and a given output SWIR wavelength range from the NLO crystal. For example, we assume the SWIR FPA contains standard InGaAs photodetectors with a maximum wavelength of 1670 nm for their detection range. The quasi-phase-matching curves shown in graph (a) of FIG. 18 indicate that a period of 50 µm for the reversals in crystallographic-orientation would be suitable for up-converting VLWIR input light but a period of 100 µm would be too large. The curves in graph (b) of FIG. 18 illustrate that for pump light of a given wavelength (such as 2000 nm), a QPM period of 40 µm is suitable for up-converting 7.5 µm wavelength input light but a QPM period of 50 µm or 60 µm is needed to up-convert input light of 9 µm or 11 µm wavelength, respectively. Also pump light of shorter wavelength is desired for up-converting input light of longer wavelength, for a given QPM period. FIG. 18b also illustrates that as the QPM period is increased, the wavelength of the generated SWIR light also becomes longer unless the pump wavelength is reduced. Thus for a given wavelength of the input light, it may be preferable to choose a smaller rather than larger QPM period and a shorter wavelength pump light, especially to reduce the wavelength of the generated SWIR light. The wavelength of the pump light, however, is preferably greater than two times the maximum wavelength absorbed by the material of the NLO material. For example, GaAs has an absorption edge near 850 nm, thus the wavelength of the pump light can be 1700 nm and longer to avoid loss of the pump light from two-photon absorption processes in a NLO crystal comprising GaAs.

FIGS. 19a-19f and 20a and 20b illustrate some of the key steps in a process for fabricating 1 two dimensional array of waveguides $120_W$ of one embodiment of a waveguided NLO element 120. Such a waveguide-containing or embodied NLO element 120 is depicted by in FIGS. 14, 16 and 17. Now one possible method for the fabrication of a waveguided embodiment of a quasi-phase-matching NLO element 120 comprising orientation-patterned GaAs (OP-GaAs) waveguides will be explained in greater detail with reference to FIGS. 19a-19f and 20a and 20b. A similar approach could be used for fabricating orientation-patterned GaP waveguides. First a periodic pattern of OP-GaAs material is grown by known techniques for the making of a slice 170. See FIGS. 19 and 19f. The growth of OP-GaAs crystals is described in an article by L. A. Eyres, et al. ("All-epitaxial fabrication of thick, orientation-patterned GaAs films for nonlinear optical frequency conversion," Applied Physics Letters, v. 79, n. 7 p. 904 (2001)) and in an article by A. Grisard, et al. ("Quasi-phase-matched gallium arsenide for versatile mid-infrared frequency conversion," Optical Materials Express, v. 2, n. 8, p. 1020 (2012)), which articles are hereby incorporated herein by reference. Additionally, relatively large pieces of OP-GaAs are available from companies such as Physical Sciences Inc. of Andover, Mass.

The OP-GaAs material (or wafer) 194 which forms a slice 170 is generally grown on a GaAs base layer (not separately called out with a numeral since the growth of OP-GaAs, for example, is known in the art). That GaAs base layer can be formed directly on a substrate 190 comprising a material such as GaAs or can be formed on an optional intervening layer 192 of AlGaAs or AlAs that is grown first on the substrate 190 as illustrated in FIG. 19a. The intervening layer 192 could be useful for subsequent removal of GaAs substrate after the waveguides are formed, as discussed below. The OP-GaAs material 194 has a periodic pattern comprising alternating regions 1941 and 1942 of two different GaAs materials having different crystallographic orientations as is depicted by FIG. 19f showing a small portion of wafer 194. For example, those regions 1941 and 1942 could respectively comprise (0$\bar{1}$1) material and (011) material. The desired period of those reversals in crystallographic orientation depends on the need for achieving the quasi-phase-matching of the pump laser light, input light 102 and up-converted SWIR light, the wavelengths or optical frequencies of that light and the dispersion characteristics of GaAs. Design curves such as those illustrated in FIG. 18 can be used to determine the desired period of the OP-GaAs structure for a given combination of pump light, LWIR/VLWIR input and up-converted SWIR wavelengths.

The wafer of OP-GaAs material 194 is polished to smooth its top surface and then long and narrow strips of the OP-GaAs material are formed by a patterned etching processes to form grooves 195 (see the Back-end view portion of FIG. 19b) thereby defining strips of OP-GaAs material which define the material of waveguides $120_W$. Known methods can be used for depositing etch-mask materials, for patterning these groove features by means such as photolithography, and for etching GaAs material by means such as reactive ion etching. The strips of OP-GaAs material are generally aligned such that their longitudinal axis is parallel to the direction having the periodic changes in crystallographic orientation and each strip of the OP-GaAs material will become an individual waveguide $120_W$ in element 120 when its fabrication is completed. So each strip will function as an optical waveguide $120_W$ for the input LWIR/VLWIR light 102, as well as for the up-converted SWIR light and the pump light. The waveguides $120_W$ may additionally have a tapered structure $120_T$ (tapered in waveguide height and/or width, as illustrated in FIG. 17, which serves to improve the efficiency of coupling the input LWIR/VLWIR light 102 into the portion of the waveguide $120_W$ that has a small cross-sectional area downstream light-wise from the input end adjacent lenses 150. Single-stage or multi-stage tapers could be used, such as the ones described in a paper by A. Barkai, et al. ("Double-stage taper for coupling between SOI waveguides and single-mode fiber," Journal of Lightwave Technology, v. 26, n. 24, p. 3860 (2008)), which paper is hereby incorporated herein by reference. The cross-sectional size of each waveguide $120_W$ at the output end of the taper $120_T$, and also through most of the length of each OP-GaAs waveguide $120_W$, can be much smaller than the cross-sectional size at the input end of the taper adjacent lenses 150. For example, the size at the input of the taper may be 30 µm×30 µm and the size at the output of the taper may be 6 µm×6 µm. Note that the micro-lens array 150 (depicted in FIG. 17) for the pump light separates and focuses that pump light into the small cross-section waveguides $120_W$. This concentration of the pump light improves the efficiency of the up-conversion process that occurs in the small cross-section waveguides. The micro-lens array 150 should have minimal effect on the input light. This may mean that the micro-lens array 150 is placed on the other side of mirror 129 remote from NLO structure 120.

Longitudinal tapering of the individual strips of OP-GaAs material (forming waveguides $120_W$) in slice 170 is depicted by FIG. 19b where the tapering occurs step-wise in three stages. Utilizing a relatively large number of taper stages in the forming of the taper $120_T$ would increase cost of manufacturing the waveguide embodiment of element 120 compared to a lesser number of taper stages, but, of course, more stages provide a more adiabatic coupling of the LWIR/VLWIR light into the narrow waveguide regions of $120_W$.

The space between the etched OP-GaAs tapers and strips of a slice 170 is then filled with a dielectric material 196 whose optical refractive index is lower than the refractive index of GaAs (see also FIG. 19c). Examples of such dielectric material include silicon dioxide, spin-on glass, polyimide, and benzo-cyclo-butene (BCB). Preferably the deposited dielectric material 196 is sufficiently thick to define the thickness of a slice 170 of the waveguide structure if the NLO element comprises a 2D arrangement of tapered NLO waveguides $120_W$. The top surface of the dielectric film 196 can be planarized by means such as polishing. This dielectric material 196 comprises the waveguide-separation buffer material 196 in the NLO element also shown, for example, in FIG. 15, filling the gaps formed by the grooves 195 between waveguides $120_W$.

The structure (a slice 170 comprising a plurality of strips or waveguides $120_W$ plus layers 190, 192, 196) is then bonded onto a carrier substrate 197 using a preferably removable bonding film 198. The GaAs substrate 190 on which the OP-GaAs material was grown is then removed by means such as lapping, polishing and/or selective etching.

Having the optional AlGaAs or AlAs layer 192 between that GaAs substrate 190 and the OP-GaAs material 194 is useful as an etch-stop. The AlGaAs or AlAs layer 192 can then be removed by a selective etching process to reveal the OP-GaAs waveguides, whose bottom-side is now exposed as depicted by FIG. 19d. If desired, the bottom-side of the waveguides $120_W$ can be covered with additional waveguide-separation buffer material 176 at this time. The buffer material 176 acts as a temporary carrier for the thin slice 170 containing an array of OP-GaAs QPM waveguides $120_W$ embedded in the waveguide separation buffer material 196. Material 176 may be a dielectric material like the material of the waveguide-separation buffer 196.

The OP-GaAs waveguides $120_W$ in slice 170 can then be bonded onto a permanent base substrate 178, such as a ZnSe wafer or even another GaAs wafer that may coated, if desired, with a dielectric material like the material of the waveguide-separation buffer 196. Known bonding materials 180 such as BCB, Brewer Waferbond CR-200, and/or SU-8 may be used to bond slice 170 to base substrate 178. The carrier substrate 197 on the opposite side of the OP-GaAs waveguide-containing slice 170 and the removable bonding film 198 used for that previous bonding can then be removed using a suitable solvent to release the carrier substrate 197. After the carrier substrate 197 is removed, the waveguides $120_W$ are again oriented top-side up as shown in FIG. 19e.

This technology may be used in a number of different systems and platforms that, for example, observe the light from very distant objects or which observe narrow-bandwidth LWIR light, including LWIR light comprising multiple LWIR sub-bands. Additional applications could include the observation and analysis of chemical effluents from objects such as industrial chimneys by examining the signature-like absorption/reflection spectra of these chemicals.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . "

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. An optical imager for imaging or detecting input light having wavelengths in the range of 4-16 µm, the optical imager comprising an input lens system, a non-linear quasi-phase matching optic crystal generating light having wavelengths in the 1.2-2.5 µm range and arranged to receive input light from the input lens system, a pump source for generating pump light having wavelengths shorter than the wavelengths of the input light but longer than the light generated by the non-linear quasi-phase matching optic crystal, and a photodetector array responsive to light having wavelengths in the range of 1.2-2.5 µm, the input lens system coupling input or incident light onto the non-linear optic crystal, the pump source providing said pump light for the non-linear optical crystal, the non-linear optical crystal producing output light from a combination of the input light and the pump light, and the photodetector array detecting the output light produced by the non-linear optic crystal.

2. The optical imager of claim 1 wherein the pump light comprises different distinct wavelengths, each distinct wavelength of the pump light being generated by one of a plurality of different lasers.

3. The optical imager of claim 1 wherein the pump light comprises different distinct wavelengths, each distinct wavelength of the pump light being generated by one or more tunable lasers.

4. The optical imager of claim 1 wherein the detector array is adapted for detecting light whose wavelength is shorter than one-half the wavelengths of the pump light.

5. The optical imager of claim 1 wherein the pump source comprises one or more lasers, the one or more lasers and the non-linear quasi-phase matching optic crystal sharing a common optical cavity with the one or more lasers and the non-linear quasi-phase matching optic crystal being disposed in said common optical cavity.

6. The optical imager of claim 5 wherein the pump source comprises a plurality of lasers each adapted to generate laser light of differing wavelengths, the plurality of lasers and the non-linear quasi-phase matching optic crystal being disposed in said common optical cavity.

7. The optical imager of claim 6 wherein the cavity is a ring cavity.

8. The optical imager of claim 6 wherein the cavity is a linear cavity with reflecting mirrors disposed for reflecting light at each optical end of the linear cavity.

9. The optical imager of claim 1 wherein the pump light reflects bi-directionally in a bi-directional optical cavity, the non-linear quasi-phase matching optic crystal being disposed within said bi-directional optical cavity.

10. The optical imager of claim 1 wherein the non-linear optic crystal comprises an arrangement of multiple non-linear optic waveguides.

11. The optical imager of claim 10 wherein the multiple non-linear optic waveguides are separated by a material having a lower refractive index than the refractive index of the material forming the non-linear optical waveguides.

12. The optical imager of claim 10 wherein the arrangement of multiple non-linear optic waveguides have a taper such that the multiple non-linear optic waveguides are wider at an input end of the non-linear optic crystal than they are at a midpoint of their respective lengths.

13. The optical imager of claim 10 wherein the arrangement of multiple non-linear optic waveguides comprises a two dimensional array of non-linear optic waveguides.

14. The optical imager of claim 1 wherein the non-linear optic crystal comprises a block of NLO-QPM material and wherein a portion, preferably in a central portion thereof, is located at a pupil plane of the input lens system.

15. The optical imager of claim 14 wherein the input lens system forms multiple spatially overlapping collimated beams from the input light and directs those collimated beams onto the block of NLO-QPM material.

16. The optical imager of claim 1 wherein the non-linear optic crystal is constructed as a stack of multiple slices, with each slice providing quasi-phase-matching for the input light, the pump light and the output light.

17. The optical imager of claim 1 wherein each slice of the non-linear optic crystal is separated from its adjacent slices of the non-linear optic crystal by a material having a lower refractive index than the refractive index of a material forming the non-linear optic crystal.

18. An optical imager for imaging or detecting input light, the optical imager comprising an input lens system, a non-linear quasi-phase matching optic crystal arranged to receive input light from the input lens system, one or more pump lasers for generating pump light having wavelengths shorter than the wavelengths of the input light but longer than the light generated by the non-linear quasi-phase matching optic crystal, and a photodetector array responsive to light of wavelength shorter than both said input light and said pump light, the non-linear optic crystal being located within a shared portion of an optical cavity which is shared by optical cavities of said pump lasers, the pump lasers providing pump light for the non-linear optical crystal, the non-linear optical crystal producing output light from a combination of the input light and the pump light, and the photodetector array detecting the output light produced by the non-linear optic crystal.

19. The optical imager of claim 18 wherein said non-linear quasi-phase matching optic crystal comprises a two dimensional array of non-linear quasi-phase matching optic crystal waveguides, said two dimensional array of non-linear quasi-phase matching optic crystal waveguides being disposed in the optical cavity, the major portion of which is shared with optical cavities of said pump lasers.

20. The optical imager of claim 18 wherein the major portion of the optical cavity which is shared with optical cavities of said pump lasers is arranged in a ring configuration.

21. The optical imager of claim 18 wherein the major portion of the optical cavity which is shared with optical cavities of said pump lasers is arranged in a linear configuration with each laser having a separate mirror at one end of said linear configuration and a shared mirror at the other end of said linear configuration.

22. An optical imager comprising an input lens system, a non-linear optic crystal, a pump source, and a photodetector array; the input lens system coupling input light onto the non-linear optic crystal, the pump source providing pump light for the non-linear optical crystal, the non-linear optical crystal comprising an array of multiple non-linear optic waveguides producing output light from the combination of the input light and the pump light, and the photodetector array detecting the output light produced by waveguides of the non-linear optic crystal.

23. The optical imager of claim 22 wherein non-linear optic crystal further comprises an array of lenses, with each lens of said array of lenses being arranged to focus the pump light on input faces of individual ones of said non-linear optic waveguides.

24. The optical imager of claim 23 wherein the array of non-linear optic waveguides each have a taper such that the multiple non-linear optic waveguides are wider at an input end of the non-linear optic crystal than they are at a midpoint of their respective lengths.

25. A method utilizing sum-frequency generation in a non-linear element to generate SWIR light in the non-linear element for detection by a focal-plane-array detector from LWIR/VLWIR input light applied to the non-linear element along with pump laser light, the pump laser light having a wavelength $\lambda_{PUMP}$ which longer than a wavelength $\lambda_{SWIR}$ of the generated SWIR light but also shorter than a wavelength $\lambda_{Input}$ of the LWIR/VLWIR input light.

* * * * *